(12) United States Patent
Golan et al.

(10) Patent No.: US 11,669,226 B2
(45) Date of Patent: *Jun. 6, 2023

(54) IDENTIFYING AND HANDLING UNINTENDED USER INTERACTIONS

(71) Applicant: Taboola.com Ltd, Ramat Gan (IL)

(72) Inventors: Lior Golan, Tel Aviv (IL); Lior Papirblat, Hod HaSharon (IL)

(73) Assignee: TABOOLA.COM LTD., Ramat Gan (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/708,816

(22) Filed: Mar. 30, 2022

(65) Prior Publication Data

US 2022/0221965 A1 Jul. 14, 2022

Related U.S. Application Data

(63) Continuation of application No. 17/306,335, filed on May 3, 2021, now Pat. No. 11,320,966.

(60) Provisional application No. 63/019,642, filed on May 4, 2020.

(51) Int. Cl.
*G06F 3/0483* (2013.01)
*G06Q 30/0601* (2023.01)

(52) U.S. Cl.
CPC ....... *G06F 3/0483* (2013.01); *G06Q 30/0641* (2013.01)

(58) Field of Classification Search
None
See application file for complete search history.

(56) References Cited

U.S. PATENT DOCUMENTS

| 5,506,952 | A | 4/1996 | Choy et al. |
| 7,603,629 | B1 | 10/2009 | Crosswhite et al. |
| 2006/0001645 | A1 | 1/2006 | Drucker et al. |
| 2006/0233339 | A1 | 10/2006 | Schwartz |
| 2011/0300901 | A1* | 12/2011 | Shen ............... G06F 3/038 455/556.1 |
| 2012/0158519 | A1 | 6/2012 | Edwards |
| 2012/0265978 | A1 | 10/2012 | Shenfield et al. |
| 2014/0215341 | A1 | 7/2014 | Fratti et al. |

(Continued)

FOREIGN PATENT DOCUMENTS

CN  106528211 A  *  3/2017  ......... G06F 9/44505

OTHER PUBLICATIONS

Extended European Search Report and European Search Opinion issued for European Patent Application No. 21171955.4-1203, dated Oct. 20, 2021.

(Continued)

*Primary Examiner* — Mandrita Brahmachari
(74) *Attorney, Agent, or Firm* — Myers Wolin, LLC

(57) ABSTRACT

A method, apparatus, and product including: obtaining a timeframe measuring a time since a content switch of a carousel widget, wherein the carousel widget displays a content card to a user, wherein the content switch comprises switching a first content card with the content card; comparing the timeframe to a time threshold; and based on said comparing, determining whether or not to perform a responsive action, wherein the responsive action comprises blocking a functionality that is associated with the content card or releasing a previously set blockage of the functionality.

19 Claims, 9 Drawing Sheets

(56) References Cited

U.S. PATENT DOCUMENTS

| | | | | |
|---|---|---|---|---|
| 2014/0368436 | A1* | 12/2014 | Abzarian | G06F 3/017 345/173 |
| 2015/0379558 | A1* | 12/2015 | Jancar | G06Q 30/0267 705/14.45 |
| 2018/0210557 | A1* | 7/2018 | Balasubramanian | G06F 3/04186 |
| 2018/0239450 | A1* | 8/2018 | Townsend | G06F 3/041 |

OTHER PUBLICATIONS

Non-Final Office Action issued for U.S. Appl. No. 17/306,335, dated Feb. 7, 2022.

* cited by examiner

IDENTIFYING AND HANDLING UNINTENDED USER INTERACTIONS

CROSS-REFERENCE TO RELATED APPLICATION

This application is a continuation of and claims the benefit of U.S. patent application Ser. No. 17/306,335, tiled "Determining and Handling Unintended User Interactions", filed May 3, 2021, which claims the benefit of Provisional Patent Application No. 63/019,642, titled "Determining Intentless User Interaction" filed May 4, 2020, all of which are hereby incorporated by reference in their entirety without giving rise to disavowment.

TECHNICAL FIELD

The present disclosure relates to unintended user interactions with a Graphical User Interface (GUI) in general, and to adjusting a display of the GUI based on a determined user intent of a user interaction, in particular.

BACKGROUND

Digital content is usually sent from a content source or server, to be consumed in a client or another machine or location. A browser (e.g. web browser) is a software application that comprises numerous software components, which process digital content of various types (normally including information resources identified by uniform resource identifier or locator), together with a set of internal (i.e. defined locally by the browser) and external (i.e. defined by entities other than the browser such as the content source, the operating system, the host device, or the like) directives and constraints, and decides how the content should be laid out and displayed on a display device of a certain host computer, under the specific circumstances.

BRIEF SUMMARY

One exemplary embodiment of the disclosed subject matter is a method implemented in a computerized environment in which a carousel widget is displayed to a user, wherein the carousel widget displays a content card, the method comprising: obtaining a timeframe measuring a time since a content switch of the carousel widget, wherein the content switch comprises switching a first content card with the content card; comparing the timeframe to a time threshold; and based on said comparing, determining whether or not to perform a responsive action, wherein the responsive action comprises blocking a functionality that is associated with the content card or releasing a previously set blockage of the functionality.

Another exemplary embodiment of the disclosed subject matter is an apparatus comprising a processor and coupled memory, said processor being adapted to: obtain a timeframe measuring a time since a content switch of a carousel widget, wherein the carousel widget displays a content card to a user, wherein the content switch comprises switching a first content card with the content card; compare the timeframe to a time threshold; and based on said comparing, determine whether or not to perform a responsive action, wherein the responsive action comprises blocking a functionality that is associated with the content card or releasing a previously set blockage of the functionality.

Yet another exemplary embodiment of the disclosed subject matter is a computer program product comprising a non-transitory computer readable medium retaining program instructions, which program instructions when read by a processor, cause the processor to: obtain a timeframe measuring a time since a content switch of a carousel widget, wherein the carousel widget displays a content card to a user, wherein the content switch comprises switching a first content card with the content card; compare the timeframe to a time threshold; and based on said comparing, determine whether or not to perform a responsive action, wherein the responsive action comprises blocking a functionality that is associated with the content card or releasing a previously set blockage of the functionality.

Optionally, the timeframe measures a time since the content switch of the carousel widget until a subsequent user interaction with the carousel widget after the content switch, whereby selectively preventing user interactions with the carousel widget posteriori.

Optionally, the timeframe measures a time since the content switch of the carousel widget until a current time, whereby user interactions with the carousel widget are a-priori prevented.

Optionally, the functionality that is associated with the content card comprises navigating to a target resource, activating a media file, rendering a resource within a browsed page presenting the carousel widget, or the like.

Optionally, blocking the functionality comprises wrapping the carousel widget within an auxiliary element or displaying one or more transparent elements over the carousel widget.

Optionally, blocking the functionality comprises configuring the carousel widget to be unclickable, or configuring the carousel widget to point to a null functionality.

Optionally, the responsive action comprises performing a functionality that is associated with the first content card.

Optionally, the functionality that is associated with the first content card comprises navigating to a target resource defined by the first content card, activating a media file defined by the first content card, rendering a resource, which is defined by the first content card, within a browsed page rendering the carousel widget, or the like.

Optionally, the method comprises identifying a user interaction with the content card of the carousel widget, wherein said identifying is after the content switch, wherein the timeframe is a time elapsed since the content switch and until the user interaction, wherein said determining whether or not to perform the responsive action comprises determining to perform the responsive action in case said comparing indicates that the timeframe is lesser than the time threshold, thereby identifying that the user interaction is unintended, wherein the responsive action comprises said blocking the functionality.

Optionally, the method comprises identifying a user interaction with the content card of the carousel widget, wherein said identifying is after the content switch, wherein the timeframe is a time elapsed since the content switch and until the user interaction, wherein said determining whether or not to perform the responsive action comprises determining not to perform the responsive action in case said comparing indicates that the timeframe is greater than the time threshold, thereby identifying that the user interaction is intended.

Optionally, the timeframe is a time elapsed since the content switch and until a current time, and the method comprises determining whether or not to perform the responsive action by determining not to perform the responsive action in case said comparing indicates that the timeframe is lesser than the time threshold.

Optionally, the timeframe is a time elapsed since the content switch and until a current time, and the method comprises determining whether or not to perform the responsive action by determining to perform the responsive action in case said comparing indicates that the timeframe is greater than the time threshold, wherein the responsive action comprises said releasing the blockage of the functionality.

Optionally, the carousel widget comprises an indication of a remaining time until a next content switch of the carousel widget.

Optionally, the indication comprises a visual indication or a textual indication.

Optionally, the method comprises setting the time threshold based on historic user interactions.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
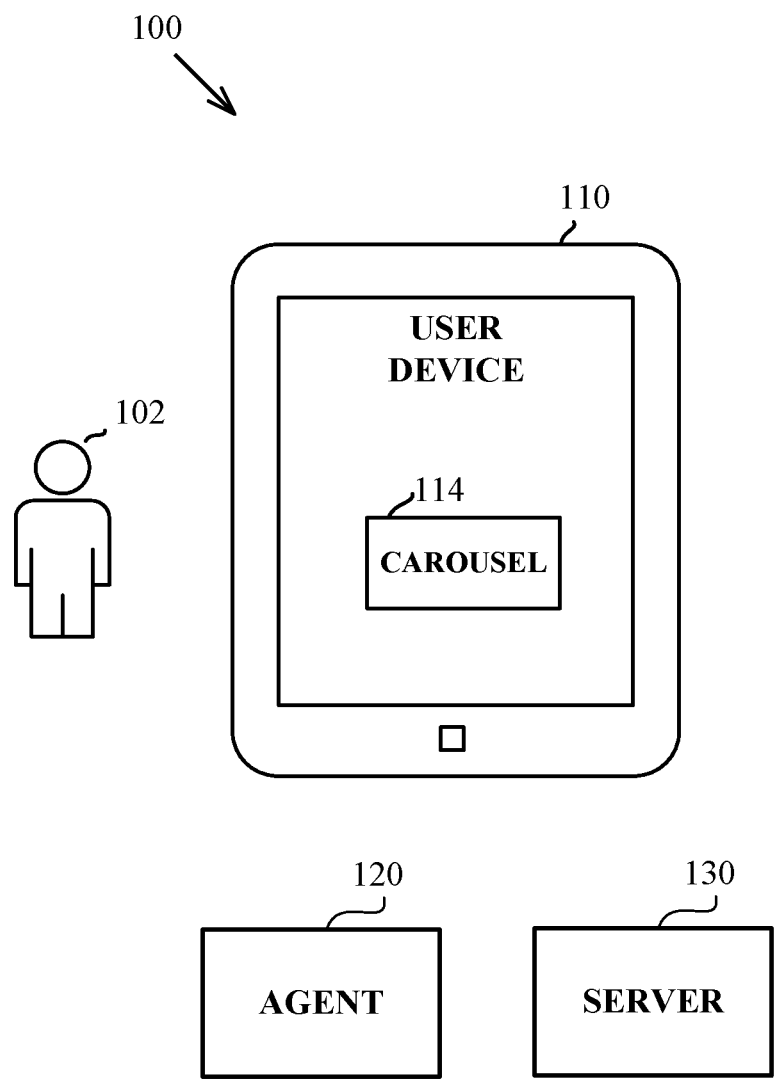
FIG. 1 shows a schematic illustration of an exemplary environment in which the disclosed subject matter may be utilized, in accordance with some exemplary embodiments of the disclosed subject matter.

One technical problem dealt with by the disclosed subject matter is to determine that a user selected a content card unintentionally, unintendedly, by mistake, or the like. In some exemplary embodiments, a user may consume content of a page via a browser of an end device, via a mobile application, or the like. In some exemplary embodiments, browsers may comprise a software that runs on an end device, obtains digital content, and renders the content in a user interface such as in a Graphical User Interface (GUI) of a user device. In some exemplary embodiments, browsers may handle one or more browsing functionalities such as obtaining content and code from multiple entities, e.g., publishers, advertising entities, content servers, or the like. In some exemplary embodiments, the content may be displayed for users in layouts referred to as "pages", thereby browsing pages of content. For the avoidance of doubt, it is explicitly noted that the disclosed subject matter is not limited to web-browsers, HTML web pages, or the like. The disclosed subject matter may be utilized in any form of GUI, including but not limited to GUIs utilized in mobile applications, native applications, software programs, or the like. For ease of disclosure the terms "page", "browsed page" or the like may be used without limiting the disclosure or claimed scope to a web-browser embodiment.

In some exemplary embodiments, a user may consume a browsed page via an interface of a computerized device such as a laptop, a smart phone, a mobile phone, a tablet, a Personal Computer (PC), or the like. In some exemplary embodiments, the browsed page may include one or more content portions such as an article, and one or more additional portions or widgets such as a feed widget, a carousel widget, or the like. In some exemplary embodiments, a widget may be utilized to display content cards (also referred to as "content items"). In some exemplary embodiments, a widget of a browsed page may comprise one or more cards of content items associated with content, recommendations, GUI functionality, or the like. In some exemplary embodiments, the content cards may comprise one or more media portions such as advertising content items, content recommendations such as recommendations of similar articles, or the like, which may be presented to the user in the feed widget, in the carousel widget, in a combination thereof, or the like. In some exemplary embodiments, the content cards may be linked to content belonging to one or more domains of one or more publishers, such as the original publisher, third party publishers, or a combination thereof.

In some exemplary embodiments, the content cards may be linked to organic or non-organic (e.g., sponsored) content that may be matched to the user based on a use profile, based on content of the article, or the like. In some exemplary embodiments, the cards may be selected for the user based on user information, a context of a session, behavior information of the user, historical tracking information and engagement data relating to the user or similar users, historical tracking information and engagement data relating to the article or similar articles, other real-time factors, global events, a combination thereof, or the like. In some exemplary embodiments, the cards may be selected for the user from a repository of content items by an item selector such as a content recommendation engine, an ad server, an advertising platform, a publisher of the main content portion, the browser, an application providing the browsed page, a software agent on the end device consuming the page, or the like. As an example, one content item may be linked to an article that has a same topic as the currently browsed article in the page, that has a similar content as the currently browsed article, that originates from a same publisher as the currently browsed article, or the like. As another example, a content item may comprise a sponsored link that is of potential interest to the user, which may be determined in view of information relating to the user such as topics or categories of articles that were consumed by the user in the past, historic searches by the user, historic transactions of the user, or the like.

In some exemplary embodiments, a content card may be linked or associated with a target page that may be loaded upon selection of the card. In some exemplary embodiments, a content card may include a media content that may be activated upon selection of the card, a functionality that modifies a layout of the article, a client-side code to be invoked in response to selection of the card, or the like. In some cases, a content item may be an element where users can leave comments on the article. In some exemplary embodiments, in case a content card is linked to a target page, the card may comprise one or more text portions such as a title associated with the target page, a summary of content of the target page, one or more images associated with the target page, one or more audio files associated with the target page, one or more links to the target page, one or more links to a target resource, or the like.

In some exemplary embodiments, content cards may be presented to the user via one or more containers, widgets, or the like. In some exemplary embodiments, content cards may be presented to a user via one or more carousel widgets which may be displayed in a viewport of the user. In some exemplary embodiments, a carousel widget (also referred to as "carousel element") may comprise a container, a widget, a GUI element, or the like, that may enable to present changing content cards, e.g., restoring content cards associated with the feed widget or presented by the feed widget. In some exemplary embodiments, the carousel widget may be presented as an overlay above a page that is being consumed, within the page, or the like, e.g., at a top area of the page or in any other relative location relative to the page. In some exemplary embodiments, the carousel widget may be dynamically displayed or hidden in response to monitored events, external events, or the like.

In some exemplary embodiments, the carousel widget may enable to present a set of two or more content cards, each being linked to a different target functionality or event such as a navigation to a target page, a navigation to a target resource, an activation of a target media file, a modification of the GUI layout, obtaining a target resource, or the like. In some exemplary embodiments, the set of content cards may comprise content items that appear or do not appear in the feed widget, such as a reading recommendation, a comments pane, an advertisement, or the like. In some exemplary embodiments, each content item may enable a user to engage therewith such as via a link, a play control, a button, or any other selection means, which may activate one or more functionalities or events, e.g., play an audio or video, present an input form for a user to fill in, navigate to a target page, or the like. In some exemplary embodiments, in response to a user interaction such as a touch, click, hover, scroll, or the like at the area of the container of portions thereof, a target functionality or event may be triggered. In some exemplary embodiments, upon selecting or pressing one of the cards or a portion thereof, the audio or video clip may be played, the browser (or in-app browser of an application, or another GUI application presenting the page) may navigate to the target content page linked to the card, or the like. In some exemplary embodiments, the activation of a content card may be performed using a pointing device, using keyboard input device, via a voice command, via a text command, via a click, or the like.

In some exemplary embodiments, the carousel widget may enable to display the set of two or more content cards sequentially, one after another, such as in an iterative manner. In some exemplary embodiments, the carousel widget may be configured to switch content cards in the container between cards of the set, changing a first content item with a next content item in response to one or more events, a lack of one or more events, or the like. In some exemplary embodiments, the changing content cards may change from one content item to a next content item periodically, such as every second, every two second, or the like, resulting in a potentially circularly changing display. In some exemplary embodiments, a switch between two content items of the set may be performed by a movement of the original content item out of the container simultaneously with a movement of the next content item into the container, thus enabling the user to perceive portions of both content items during the switch. Alternatively, a switch between two content items of the set may be performed immediately, without having any timeframe during which both content items are at least partially visible in the container.

It is noted that in some embodiments the carousel widget may display several content items simultaneously. However, a rotation event or content switch event in which the content items are modified, such as by changing their placement within the carousel widget, changing their state within the carousel widget from being displayed to not being displayed or vice versa, changing their state within the carousel widget from being visible to being transparent or vice versa, or the like, may be periodically performed.

In some exemplary embodiments, a user may wish to interact (e.g., click, press, touch, hover above, scroll, or the like) with a first content item presented by the container. In some cases, between the time that the user had intended to interact with the first content item, and the time that the interaction has occurred (e.g., a mouse click was performed, a touch action was implemented, or the like), the content of the container may switch from the first content item to display at least a portion of a second content item, such as in a location that was previously used to display the first content item. In some exemplary embodiments, the user may select the second content item unintendedly, without desiring to consume content associated with the second content item or activate a functionality thereof, e.g., in case the user has not noticed that the container display has changed, in case the user did not respond quickly to the change, in case the container or portions thereof have moved in the layout of the viewport, or the like.

In some cases, the user may not wish to interact with neither the first content item or the second content item, and may unintentionally select the second content item. For example, in case a location of the carousel element has altered, and the user intended to select a GUI element that is not associated with the carousel element, the user may unintendedly select a portion of the carousel element that has moved to the location of the GUI element. In some exemplary embodiments, the display of the carousel widget in the layout may alter before the user starts to reach out to the GUI element, during an attempt to select the GUI element, simultaneously to selecting the GUI element, or the like. In some cases, the user may select a portion of the carousel element unintendedly for any other reason, such as due to a rotation or movement of the viewport that may confuse the user.

In some cases, the user interaction may occur a small time fragment after the presentation of the carousel widget had changed, such as a few milliseconds, microseconds, or other like after the change, and possibly before the user had noticed such change (e.g., even due to physical limitations on human perception). In some cases, the user interaction may be performed prior to the content switch, but processed by the browser or application a small time fragment after the presentation of the content cards had changed, such as a few milliseconds, microseconds, or other like, after the change. In some exemplary embodiments, the unintended interaction may cause the user to, by a mistake, activate a functionality of the second content item such as to browse content associated to the second content item without intending to do so. It may be desired to identify or determine that the user interaction comprises an unintended interaction, that the second content card was selected by mistake.

Another technical problem dealt with by the disclosed subject matter is to prevent unintended interactions from taking place. In some exemplary embodiments, upon identifying an unintended interaction, it may be desired to ensure that the user will not be navigated to a wrong content page, that an unwanted functionality is not activated, or the like, thereby enhancing a User eXperience (UX) of a user consuming content of the page.

Yet another technical problem dealt with by the disclosed subject matter is to override an unintended interaction that is detected. It may be desired to activate a functionality that was not selected by the user but is estimated to be the intended functionality of the user. For example, in case the user intended to select a first content card, and unintendedly selected a second content card due to a carousel content switch, it may be desired to navigate the user to a content page that is associated to the first content card and not to the second content card.

Yet another technical problem dealt with by the disclosed subject matter is to set a time threshold for identifying unintended interactions. It may be desired to determine a time threshold between a content switch of the carousel widget and a user interaction. In some exemplary embodiments, the time threshold may be utilized in order to determine that a user selected a content item unintendedly, e.g., in case that a time that has passed from the content change until the user interaction is below the threshold.

Yet another technical problem dealt with by the disclosed subject matter is to enhance a visibility of content switch, thereby enabling users to reduce a number of unintended interactions with the carousel element.

One technical solution is to handle a user interaction based on a relative timing of the interaction. In some exemplary embodiments, an elapsed time from a content switch to the time that the user selected a portion of the carousel widget, may be monitored, obtained, or the like. In some exemplary embodiments, the time that has passed from a content change of the container until the user interaction, may be compared to a time threshold. In some exemplary embodiments, in case that the elapsed time is below a time threshold, such as below 10 milliseconds, 100 milliseconds, 200 milliseconds, 400 milliseconds, or the like, the interaction may be determined or classified to be an unintended interaction with the content item. In some exemplary embodiments, this may indicate that the user unintendedly interacted with the content item, while intending to interact with a previous content item of the carousel widget that was presented prior to the content switch, intending to interact with an element that is external to the carousel widget, or the like. In some exemplary embodiments, a difference between the elapsed time and the threshold may be used as a confidence score of the intent classification.

In some exemplary embodiments, various responsive actions may be performed in case unintended interactions are identified, such as ignoring or blocking the interaction, mimicking a different user interaction or action, or the like. In some exemplary embodiments, upon determining that the interaction was unintended, a responsive action may be performed. In some exemplary embodiments, the responsive action may comprise ignoring the interaction of the user, instructing the browser or application to discard a request to perform a functionality that is linked to the content item, blocking a request to perform the functionality that is linked to the content item to prevent the request from being generated and transmitted. In some exemplary embodiments, while the elapsed time is smaller than the time threshold, an action that is configured to be triggered in response to the user interaction may be disabled. In some exemplary embodiments, the responsive action may comprise simulating a functionality that is linked to the previously displayed content item (e.g., following the link that is associated with such content item), rendering content that is linked to an element that was estimated to be intended to be selected by the user, instructing the browser or application to simulate a functionality that is linked to the previously displayed content item, or the like.

Additionally or alternatively, instead of identifying unintended interactions and selectively preventing the functionality a posteriori, the blocking may be performed a-priori by updating the user display in a manner that blocks the functionality upon identifying a content switch. For example, upon identifying a content switch (e.g., in response to invoking a content switch, in response to identifying that a content switch was implemented, or the like), an overlay may be added on top of the carousel widget or portion thereof, capturing any interaction event and blocking the interaction with the carousel widget itself. It is noted that the content switch may be invoked by a third-party and merely identified by the disclosed subject matter. Additionally, or alternatively, the content switch may be invoked by the disclosed subject matter and the blocking functionality may be implemented in response to such invocation. In some exemplary embodiments, upon identifying a content switch, the carousel widget may be wrapped within an auxiliary element that can intercept interaction events with the carousel widget. Additionally or alternatively, upon identifying a content switch, the carousel widget may be updated to be unclickable, to be clickable but to point to null functionality, or to be otherwise a-priori disabled. It is noted that the disclosed subject matter may ensure that the visual representation of the carousel widget may remain unmodified even if the carousel widget becomes disabled (e.g., remaining with an underline, retaining a functionality of a clickable mouse cursor when hovered above, or the like). In some exemplary embodiments, upon identifying a content switch, the GUI may be updated to block a functionality of the carousel widget based on the time elapsed since the last content switch of the carousel widget. After a threshold time has passed, the GUI may be updated once more to remove the blockage and allow the interactions to occur. For example, the GUI may be updated periodically immediately when the content switch occurs to block potential interactions and may be re-updated 150 milliseconds after each blockage to allow interaction with the carousel widget. In such an embodiment, the carousel widget may be unaware of the disclosed subject matter being implemented and may simply receive only intended interactions. In some cases, the blockage may be removed upon identifying one or more events that occur prior to the threshold time elapsing, e.g., upon identifying a first user interaction (e.g., allowing a second interaction to be processed), upon identifying a repeating user interaction, in response to identifying a defined event, or the like.

In some exemplary embodiments, in case that the elapsed time is larger than the time threshold, and an a-priori disablement was implemented, the a-priori disablement may be lifted, released, cancelled, or the like. In some exemplary embodiments, in case that the elapsed time is larger than the time threshold, and a selective posteriori disablement was implemented, any action that is configured to be triggered in response to the user interaction with the carousel widget, e.g., navigating to an associated content page, may be enabled to be executed, without blocking such actions.

In some exemplary embodiments, the time threshold may be determined, set, obtained, or the like, based on one or more parameters, conditions, rules, or the like. In some exemplary embodiments, the time threshold may be determined dynamically in real-time while the user is interacting with the GUI, statically, based on heuristics, a combination thereof, or the like. In some exemplary embodiments, the time threshold may be determined based on characterization of the user, based on estimated levels of her intent to interact with the carousel widget or with content items within the carousel, based on an history of interactions of similar users with similar or different webpages, based on an history of interactions of the user with similar or different webpages, or the like. In some exemplary embodiments, the time threshold may be utilized in order to determine whether an interaction by the user was intended and should be acted upon, or whether the interaction was unintended and should be ignored, blocked, override, or the like. In some exemplary embodiments, the time threshold may be utilized in order to determine when an automated blockage of the carousel widget's functionality should be lifted. In some exemplary embodiments, the time threshold may be utilized for classifying the user's intent in case a user would or does perform a user interaction prior to the time threshold elapsing.

In some exemplary embodiments, in order to enhance a visibility of content switch, one or more modifications may be performed to the layout of the page, to the viewport of the user, to the layout of the carousel widget, or the like. In some exemplary embodiments, the carousel widget may be modified to include an indication of a remaining time until a next content switch. In some exemplary embodiments, the indication of the remaining time may be indicated via a text of the remaining time, an audio indicating the remaining time, a visual graph or shape that corresponds to the remaining time, or the like. In some exemplary embodiments, the indication may be updated periodically to indicate an updated remaining time, e.g., according to a clock of a user device that is used to present the browsed page, according to a clock of a remote server such as a content server, periodically according to a defined period of time such as every 20 millisecond, or the like. In some exemplary embodiments, the indication may be updated periodically to match an adjusted time threshold. In some exemplary embodiments, the indicated remaining time may enable users to reduce a quantity of unintended interactions, as they may be enabled to perceive that a switch is about to occur prior to performing an unintended functionality.

One technical effect of utilizing the disclosed subject matter is providing an improved UX of a viewport, that can identify whether or not a click on a widget is intended or unintended and act accordingly. A time threshold may be set to determine a maximal elapsed time between a content change of a container and an interaction with the container, such that any time period below the timeframe may be used to classify the user interaction as unintended.

Another technical effect of utilizing the disclosed subject matter is preventing from unintended functionalities to be activated, executed, or the like. Utilizing the disclosed subject matter may enable to dynamically determine a probability that the user intended to select a previous content card, and avoid from presenting to the user a functionality that is not of interest to the user, e.g., a functionality of a next content card that was switched into the user's view a small time fragment before the user interaction. For example, in case a selection of a content card is determined to be unintended, the disclosed subject matter may block an event propagation of selecting the content card, such as blocking a navigation to a target page that is associated to the content card.

Yet another technical effect of utilizing the disclosed subject matter is to automatically block a functionality of a carousel widget upon identifying a content switch, until a defined time period has elapsed. This may prevent an occurrence of unintended interactions with the carousel widget.

Yet another technical effect of utilizing the disclosed subject matter is to provide an intended functionality to the user. In case an interaction is determined to be unintended, the disclosed subject matter may estimate that the user in fact intended to select a previous content card, or any other element that was previously placed in the selected page area, and the intended interaction may be implemented instead of the unintended interaction, e.g., loading a functionality or event that is associated with the previous content card.

In some exemplary embodiments, when an interaction is blocked, if the user had indeed intended to interact with the displayed content item, the user may simply re-interact with the carousel widget. Such UX may be natural to the user who may simply assume that the interaction was not received or that the selection was not identified, as sometimes occurs with computerized devices. This way, unintended functionalities may be prevented from being activated without adversely affecting the UX of the user.

The disclosed subject matter may provide for one or more technical improvements over any pre-existing technique and any technique that has previously become routine or conventional in the art. Additional technical problem, solution and effects may be apparent to a person of ordinary skill in the art in view of the present disclosure.

Referring now to FIG. 1 showing an illustration of an Environment 100, in accordance with some exemplary embodiments of the disclosed subject matter.

In some exemplary embodiments, Environment 100 comprises at least one User Device 110. In some exemplary embodiments, User Device 110 may comprise one or more mobile phones, tablets, laptops, PCs, or the like. In some exemplary embodiments, User Device 110 may be used by a User 102 that may utilize User Device 110 to consume content, perform virtual activities, or the like.

In some exemplary embodiments, User Device 110 may comprise a browser or a software application, that may be executed on User Device 110, and may enable User Device 110 to obtain digital content from servers and render the content in a user interface of User Device 110. In some exemplary embodiments, the browser may comprise a web browser. In some exemplary embodiments, the software application may comprise a mobile application, a native application, or the like. Additionally, or alternatively, the software application may be web-based and may enable User 102 to browse or consume one or more application pages. In some exemplary embodiments, the browser (referring also to the software application or an in-browsing functionality within the software application, for simplicity purposes) may handle one or more browsing functionalities such as obtaining content and code from one or more servers, e.g., publishers, advertising entities, content servers, or the like.

In some exemplary embodiments, Environment 100 comprises a computerized agent, such as an Agent 120, e.g., internal to a memory of User Device 110, external thereto, remotely therefrom, or the like. In some exemplary embodiments, Agent 120 may comprise a client-side program such as a software or a script that may or may not be enabled to function independently from a server, e.g., without being required to communicate with any server. In some exemplary embodiments, Agent 120 may be able to monitor a GUI of the user, changes thereof, user interaction therewith, or the like.

In some exemplary embodiments, Environment 100 comprises a Server 130. In some exemplary embodiments, Server 130 may be connected to one or more networks, such as a Local Area Network (LAN), Wide Area Network (WAN), intranet, the Internet, a cellular network, a combination thereof, or the like. In some exemplary embodiments, Server 130 may be integrated in a user device, may be a remote server, a combination thereof, or the like. In some exemplary embodiments, Server 130 may be associated with Agent 120. For example, Server 130 may generate Agent 120, Server 130 may provide Agent 120 to User Device 110, Server 130 may obtain Agent 120 from a network node, or the like.

In some exemplary embodiments, the browser may browse a webpage comprising an article (or any other content portion) and a Carousel Widget 114 presenting a plurality of content cards, e.g., sequentially. In some exemplary embodiments, Carousel Widget 114 may be presented at a top portion of the page, at a bottom portion of the page, or at any other relative location of the page.

In some exemplary embodiments, the content cards may be associated or linked to one or more target pages, target resources, media files, or other functionalities. For example, a content card may comprise a link to a target page, which may be embedded visibly or invisibly within the card, or associated therewith in any other way. In some exemplary embodiments, a functionality of a content card may be associated to an interaction (e.g., a click) of User 102 with Carousel Widget 114 or with portions thereof, which may be configured to cause the browser to activate the functionality, e.g., navigate to the target page, load target resources, or the like. In some exemplary embodiments, a link to a target page may comprise a Uniform Resource Locator (URL) link, and triggering URL the link may cause the browser to display a content that is indicated by the URL. In some cases, a link to a target page may comprise a Uniform Resource Identifier (URI) link, and triggering the URI link may cause the browser to display a content indicated by the URI or to execute an instruction embedded in the URI. For example, Carousel Widget 114 may present sequentially a first content card that is associated with an advertising page, and a second content card that is associated with a content page. According to this example, in case User 102 clicks on the first content card or a link therein, the advertising page may be loaded, triggered, or the like.

In some exemplary embodiments, Agent 120 may be configured to monitor content switches of Carousel Widget 114 or otherwise be invoked when such content switches occur, when one or more content cards of Carousel Widget 114 are swapped, and measure a timeframe from each identified content switch. In some exemplary embodiments, Agent 120 may be configured to automatically block one or more functionalities of Carousel Widget 114 in response to the content switch, and release the previously set blockage upon determining that an elapsed time from the content switch complies with a threshold. In some exemplary embodiments, Agent 120 may set and/or adjust the threshold based on one or more calculations, classifiers, or the like.

In some exemplary embodiments, Agent 120 may not automatically block one or more functionalities of Carousel Widget 114 in response to the content switch. In some exemplary embodiments, Agent 120 may be configured to monitor user interactions with the Carousel Widget 114 and to determine whether or not to override a functionality of the browser or application. In some exemplary embodiments, Agent 120 may measure a timeframe from a content switch of Carousel Widget 114, when one or more content cards are swapped, until an interaction of User 102 with Carousel Widget 114. In some exemplary embodiments, Agent 120 may determine whether or not the interaction was intended, based on a comparison of the measured timeframe to a threshold. In some exemplary embodiments, Agent 120 may block a clicking or selecting functionality of Carousel Widget 114, and, after the threshold time has elapsed, or any other defined timeframe or event has elapsed, Agent 120 may enable the event, rendering the area of Carousel Widget 114 or parts thereof clickable, enabling navigation to a target page, or the like. In some exemplary embodiments, Agent 120 may set and/or adjust the threshold based on one or more calculations, classifiers, or the like.

In some exemplary embodiments, in case a user interaction is estimated to be unintended, Agent 120 may block one or more functionalities that are associated with Carousel Widget 114, and/or execute one or more alternative functionalities that are not associated with the selected content card. In some exemplary embodiments, Agent 120 may block functionalities of the content card or Carousel Widget 114 in a full or partial manner. In some cases, one or more interactions with Carousel Widget 114 that may always remain enabled. In some cases, Carousel Widget 114 may be enabled for certain interactions, and disabled for other interactions. In some cases, Carousel Widget 114 may be disabled for all interactions therewith. In some exemplary embodiments, Agent 120 may block a clicking or selecting functionality until a defined event is identified, for a time period defined by the threshold, or the like.

It is noted that while Carousel Widget 114 is disabled, in some exemplary embodiments, the manner in which Carousel Widget 114 is displayed may remain unchanged, e.g., without a visual indication of the disablement. In some cases, design instructions, such as implemented with Cascading Style Sheets (CSS), may be provided to cause the browser or another application displaying Carousel Widget 114, to present the content item in a same manner both when Carousel Widget 114 is enabled and disabled. In some exemplary embodiments, the content item may be displayed using design properties indicating that interactions therewith are enabled both when the interactions are enabled and when the interactions are disabled. In other cases, while Carousel Widget 114 is disabled, Carousel Widget 114 may be displayed in a manner that visually indicates the disablement.

In some exemplary embodiments, after the disablement period is completed, Carousel Widget 114 may enable User 102 to interact therewith (e.g., clicked) again. In some exemplary embodiments, Agent 120 may enable or disable functionalities of Carousel Widget 114 on the fly, without relying on connectivity to Server 130. In some exemplary embodiments, Agent 120 may enable or disable functionalities of Carousel Widget 114 utilizing one or more communications with Server 130. For example, Agent 120 may forward monitored user interactions to Server 130, and Server 130 may process the user interactions and instruct Agent 120 how to respond, e.g., whether or not a functionality should be blocked, an alternative functionality should be performed, or the like.

In some exemplary embodiments, in case the source code of Carousel Widget 114 is available and controllable by Agent 120, Agent 120 may block one or more functionalities of Carousel Widget 114 by changing the functionality in the code, by causing Carousel Widget 114 to point to null functionality, or the like. As an example, Agent 120 may have access and control over a Document Object Model (DOM) of the page in which Carousel Widget 114 is defined. As another example, Carousel Widget 114 may be implemented in code that is provided by the provider of Agent 120, and Agent 120 may be provided control over Carousel Widget 114, such as via Application Programming Interface (API). In some cases, Carousel Widget 114 may not be controlled by a party introducing Agent 120, e.g., an owner of Server 130, such as in case of third-party provided elements. For example, an advertising party or other server may provide Carousel Widget 114, generate Carousel Widget 114, or the like, while a different party may generate or provide Agent 120 to User Device 110. In such cases, Agent 120 may implement the disclosed subject matter on Carousel Widget 114 without having access or control to its source code, its binary, its DOM representation, or the like. In some cases, in case the source code of Carousel Widget 114 is not available or is not controllable by Agent 120, Agent 120 may block one or more functionalities of Carousel Widget 114 by wrapping or embedding Carousel Widget 114 within an auxiliary element, by displaying transparent elements on top of Carousel Widget 114 to effectively disable its area or parts thereof for user interactions, or the like. In some exemplary embodiments, displaying transparent shapes or rectangles on top of portions of Carousel Widget 114 or wrapping Carousel Widget 114 with another element, may enable to effectively block functionalities of Carousel Widget 114 without controlling a design or events of Carousel Widget 114. In some exemplary embodiments, any other technique may be used to block functionalities of Carousel Widget 114 with or without controlling a design or events of Carousel Widget 114.

In some exemplary embodiments, in case the interaction is estimated to be unintended, Agent 120 may perform one or more alternative functionalities or responsive actions that are not associated with the selected content card. In some exemplary embodiments, a responsive action may comprise activating a functionality of an element that was displayed in the location of the selected content card prior to the content switch. For example, the responsive action may comprise activating a functionality of a previously displayed content item, e.g., triggering a link that is associated with a previously displayed content item (e.g., as opposed to the link of the currently displayed content item), activating a media file that is associated with a previously displayed content item, rendering content of a target page within the browsed page such as into an inline frame (iframe), activating a functionality of an external GUI element external to Carousel Widget 114 that was located in the location of the content card before the content switch, or the like. In some cases, Agent 120 may not implement any alternative functionalities, and may merely block or ignore one or more functionalities of the selected content card.

In some cases, Agent 120 may be operatively coupled with Server 130, may report measurements and user interactions to Server 130, and may perform actions in response to instructions from Server 130. In some cases, Server 130 may be configured to determine a time threshold and provide the threshold to Agent 120, to enable Agent 120 to locally classify interactions as intentional or unintentional. In some cases, Agent 120 may be configured to determine a time threshold independently, without assistance of Server 130. In some cases, Agent 120 may provide to Server 130 parameters of monitored user interactions such as a touch event of Carousel Widget 114. For example, in case the user selected a second content card that is associated with a second content page an elapsed time after a content switch between a first content card and the second content card, Agent 120 may report to Server 130 parameters such as the measured elapsed time, a user identification, associated functionalities of the first and second content cards, or the like. In some cases, Server 130 may be configured to determine whether the loading of the second content page or any other associated functionality is to be enabled or blocked, whether a first content page or any other associated functionality that is associated with the first content card is to be loaded instead, or the like. For example, Server 130 may enable loading of the second content page in case Server 130 estimates that the user has likely intended to launch the second content page. As another example, Server 130 may disable loading of the second content page in case Server 130 estimates that the user has likely intended to launch the first content page of the previous content card. As another example, Server 130 may trigger loading of the first content page in case Server 130 estimates that the user has likely intended to launch the first content page of the previous content card. As another example, in case Server 130 estimates that a confidence score of the user intention is below a threshold, e.g., below 70%, 80%, or the like, Server 130 may prevent from both pages to launch, may not interfere with launching of the second content page, or the like.

In some exemplary embodiments, Agent 120 may modify a display of Carousel Widget 114 in one or more manners that may be configured to reduce a rate of unintended interactions. In some exemplary embodiments, Agent 120 may modify a display of Carousel Widget 114 to add thereto an animation or another replacement effect during a content switch such as a slow motion affect, when replacing a currently displayed content item with a next content item. In some exemplary embodiments, Agent 120 may modify a display of Carousel Widget 114 to add thereto a time indication indicating a time until a next content switch.

Figure 2A:
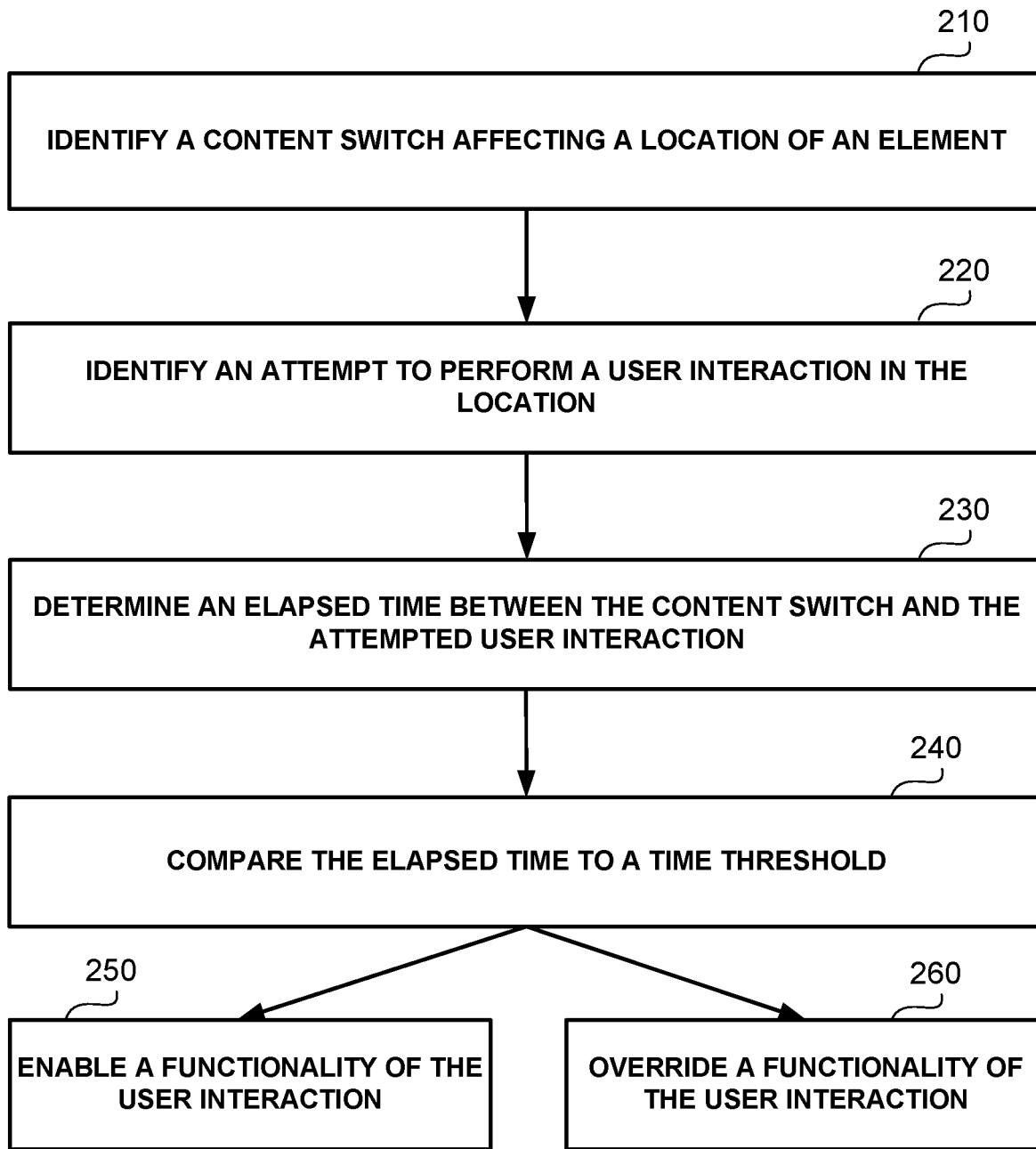
FIGS. 2A-2B show flowchart diagrams of respective methods, in accordance with some exemplary embodiments of the disclosed subject matter.

Referring now to FIG. 2A, illustrating a flowchart diagram of a method, in accordance with some exemplary embodiments of the disclosed subject matter.

In some exemplary embodiments, a user may attempt to activate a functionality of an element by attempting to select the element in the viewport of the user. In some exemplary embodiments, the element may comprise a content card of a carousel widget, or any other control element or GUI element that is external or internal to the carousel widget and is within the page that is being browsed or consumed by the user. In some exemplary embodiments, the carousel widget may be embedded within a GUI, may be presented in an overlay over a GUI, or the like. In some exemplary embodiments, the carousel widget may be configured to sequentially present a plurality of content cards associated to reading recommendations, advertisements, or the like, which may be based on organic recommendation results, sponsored recommendation results, or the like. In some exemplary embodiments, the content cards may be determined and selected from a set of potential content cards based on the content of the article, based on data regarding the user, or the like.

In some exemplary embodiments, the carousel GUI element may be a GUI element with altering content, iteratively switching content cards. The content may rotate between a set of alternative content items, such as in response to user events, lack thereof, periodically (e.g., every second, every two seconds, or the like), or the like, resulting in a circularly altering display. In some exemplary embodiments, a circular display may comprise a display of multiple items, each of which being displayed periodically, after the remaining items are displayed. In some exemplary embodiments, a single content item may be displayed in the carousel at a given time, e.g., between content switch periods, such as during a static period. In some exemplary embodiments, multiple content items may be displayed in the carousel at a given time, e.g., during content switch periods. For example, during a content switch between first and second content cards, portions of both content cards may be presented together, simultaneously, in overlapping time periods, or the like. Alternatively, multiple content items may be displayed during a static period. For example, the carousel element may display two content cards, that may be switched with two next content cards every content switch. In some exemplary embodiments, each content item may be associated with one or more functionalities such as navigating to one or more target pages, activating media files, modifying a viewport of the browsed page, or the like.

In some exemplary embodiments, a user may attempt to select an element that is placed in an area of the carousel widget, is in a proximity location thereto, e.g., a distance that is below a threshold from the carousel widget, is not in a proximity of the carousel widget, or the like. In some cases, the element may comprise a content card that is presented during a static period of the carousel element, e.g., between content switches. In some cases, the element may comprise a first content card that is presented together with a second content card during a switching period of the carousel element, e.g., the second content card switching the first, or vice versa. In some cases, the element may comprise a portion of the carousel widget that is not a content card, e.g., a "close" control configured to close the carousel element, a remaining time control until a next content switch, or the like. In some cases, the element may comprise a GUI element that is external to the carousel element or container thereof, e.g., a button that belongs to a domain of the webpage and is not associated with the carousel element.

On Step 210, prior to the user selection, the carousel widget may be modified in one or more manners, e.g., by performing a content switch between content cards, by modifying a location of the carousel widget, or the like, which may affect the location of the element. In some exemplary embodiments, the modification of the carousel widget may cause the location of the element to no longer present the element. Instead, a portion of the carousel widget that was not presented in the location prior to the content switch may be presented in the location of the element. For example, the user may desire to select a first content card of the carousel widget, that may be switched with a second content card prior to the selection of the first content card, thus placing a different card in the location of the target element. As another example, the user may intend to select an element that is external to the carousel widget, but the modification of the carousel element may move the carousel to the location of the element.

On Step 220, after the content switch, an attempt to perform a user interaction in the location of the element, e.g., via a click, a scroll, or the like, may be monitored, determined, identified, or the like. In some exemplary embodiments, the user interaction may be attempted to be performed with a new element that is positioned in the location that was previously occupied by the element that was intended to be selected. In some exemplary embodiments, although the selected item may not present the target element anymore, the user may not change her interaction or behavior in case she has not noticed that the display has changed, in case she did not respond in a sufficiently fast manner to the change, in case the container of the carousel widget or portions thereof have re-located in the layout of the viewport, in case a viewport has altered such as due to scrolling down the page, in case physical limitations on human perception do not enable the user to noticed such change, or the like.

In some exemplary embodiments, instead of interacting with the target element, with which the user has intended to interact, the user may interact with a content card of the carousel widget that is located in the previous location of the element, with a different area of the carousel widget, or the like. In some exemplary embodiments, the interaction may be performed or attempted to be performed. For example, the interactions with the carousel element may be automatically blocked after the content switch, and the interaction may be enabled upon determining that the interaction is intended. As another example, interactions of the user may be monitored by a software agent that may control their propagation, thus dictating whether or not user attempts to perform an interaction are received by the browser, application, or the like.

On Step 230, an elapsed time between the content switch and the attempted user interaction may be recorded, monitored, measured, determined, or the like. In some exemplary embodiments, the elapsed time may be measured between the time in which the display of the carousel widget changed until the user selected or pressed on a portion of the carousel widget.

On Step 240, the elapsed time may be compared to a time threshold, e.g., in order to determine whether the user selected the content card unintendedly or intentionally. In some exemplary embodiments, in case the elapsed time is determined to be lesser than the time threshold, indicating that the selection was unintendedly, the method flow may continue to Step 260. In some exemplary embodiments, in case the elapsed time is determined to be greater or equal to the time threshold, indicating that the selection was intended, the flow of the method may continue to Step 250.

In some exemplary embodiments, the time threshold may be determined, set, adjusted, or the like, based on one or more conditions, parameters, or the like. In some exemplary embodiments, the time threshold may be determined and/or adjusted dynamically in real-time while the user is interacting with the GUI. In some exemplary embodiments, the time threshold may be determined and/or adjusted statically, periodically, or the like. For example, the time threshold may be adjusted every day, every hour, every week, or the like.

In some exemplary embodiments, the time threshold may be determined based on a context of the current interaction of the user with the GUI of the browsed page. In some exemplary embodiments, the context may comprise data regarding the computerized device that is browsing the page, data regarding the application or browser that is presenting the page, data regarding the user account that is associated with the session, or the like. For example, in case the user account indicates that the user typically perceives changes during a certain responsive timeframe, e.g., 50 milliseconds, that time threshold may be set according to the typical responsive timeframe. In some exemplary embodiments, the context may comprise Personally Identifiable Information (PII), non-PII data, demographic information of the user, geo-location information of the user, information regarding the user agent utilized by the user, referrer information, hardware device utilized by the user, Operating System (OS) or other applications utilized by the user, or the like. In some exemplary embodiments, the time threshold may be determined based on a content context of the session, such as a content category of the article, a category of content items in the carousel (currently shown, previously shown, or the like), visual aspects of the GUI or widget (e.g., type of content replacement effects utilized, color scheme, or the like), demographic information about the user account (e.g., age, gender, geo-location, or the like), other properties of the user (e.g., user device information, profile of the user, behavioral patterns of the user, history of events, estimated mood and interests, session-related information, referrer information, activated events in the same page or session, or the like), global events, time of day, date, interaction-related data (e.g., properties of the interaction, type of interaction, mouse movement patterns, relative location of the interaction within the widget, relative location of the interaction within the content item), or the like. As an example, a mood of the user may be inferred from session information, e.g., indicating that the user may be tired, drinking alcohol, or otherwise in a mood that affects her likelihood to perform unintentional interactions. Additionally or alternatively, the time of day may be late, e.g., 1 am, 2 am, or the like, indicating that the responsive time of the user may be longer than in earlier day times, which may affect a number of occurrences of unintended interactions.

In some exemplary embodiments, the time threshold may be determined based on a unique identification (ID) of a user, e.g., a cookie-based identifier, a Media Access Control (MAC) address, user credentials, other physical or virtual identifiers, or the like. In some exemplary embodiments, based on the identifier of the user, historic information of the user may be retrieved, e.g., enabling to estimate a sufficient response time that is sufficient for the user, an insufficient response time, or the like. In some exemplary embodiments, the time threshold may be set to comprise a minimal timeframe that is sufficient to enable the user to response to a change. Additionally or alternatively, in the absence of an identifier or in the absence of historical information regarding the user, similar cohort that the user belongs to (e.g., based on the user session) may be identified and reference information regarding the cohort may be utilized instead of reference information that is uniquely associated with the user.

In some exemplary embodiments, the time threshold may be determined based on a history of interactions of the user (or users of the reference cohort) with the GUI of the webpage, with GUIs of other webpages, or the like. In some exemplary embodiments, the history of interactions with the GUI may comprise time spent by the user on each portion of the GUI, clicks made on the GUI, touch events of the user in the GUI, time durations in which mouse cursor was moved, average time durations between a beginning of user activity and until an interaction with the widget occurred, or the like. In some exemplary embodiments, the history of interactions of the user with other GUIs may comprise time spent on another GUI comprised by the other GUIs, clicks made on another GUI comprised by the other GUIs, touch events made on another GUI comprised by the other GUIs, or the like. In some exemplary embodiments, the history of interactions of the user with GUI may comprise actions performed by the user that are related to the GUI but were not made on the GUI itself.

In some exemplary embodiments, the user interactions may be analyzed to identify unintended actions. In some exemplary embodiments, unintended actions may be identified in case they were cancelled by the user, such as pressing a back button, closing a browser window or tab, closing an application, or the like, which may be indicative of the user intending to press another item other than an item that was pressed. In some exemplary embodiments, unintended actions may be identified in any other way. In some exemplary embodiments, the user interactions may be analyzed to identify intended actions or lack thereof that may indicate that the user had intended to perform an action, e.g., follow a link from the GUI. For example, a time-until-bounce measurement may indicate whether the link was pressed with intent to interact with the content item associated with the link or not. In some exemplary embodiments, the time threshold may be determined to include a time that is sufficient for the user to perform an intended action, based on the analyzed user interactions. As an example, a GUI may be open for time duration that does not allow for its content to be consumed by the user. Such time duration may indicative that the user launched the GUI unintendedly.

In some exemplary embodiments, the determination of the time threshold may be specifically tailored to the user herself. As an example, the history of interactions of the user may comprise one or more records indicating that the user pressed a widget and that in response, a content linked to the widget was loaded. Additionally or alternatively, the history of interactions may comprise one or more records indicating that the content was consumed by the user for a very short time period, such as 0.5 seconds, one second, or the like. Additionally or alternatively, the records may comprise an indication that the user pressed a back button after the very short period in which the content was revealed to her. In some exemplary embodiments, based on at least one of the above indications, it may be estimated that the user unintendedly clicked on the widget as she may have not noticed that the displayed content of the widget has changed, the location of the widget has changed, or the like. In such cases, the computerized agent may be configured to set or adjust the time threshold, e.g., increase a previous time threshold in case a previous time threshold according to the current subject matter was utilized.

In some exemplary embodiments, the time threshold may be determined by utilizing one or more predictors, machine learning classifiers, heuristics-based classifiers, Artificial Intelligence (AI) classifiers, statistical learning modules, or the like. In some exemplary embodiments, a predictor may be implemented using supervised learning, e.g., using labeled data regarding users, unsupervised learning, partially supervised learning, or the like. In some exemplary embodiments, the predictor may utilize an Artificial Neural Network (ANN), a Support Vector Machine (SVM), a decision tree, statistical learning methods, or the like. The predictor may be executed on a remote server, locally on the browsing device, or the like.

In some exemplary embodiments, a predictor may be configured to predict if a user pressed the widget in a timely manner with respect to the currently displayed content. In some exemplary embodiments, a predictor may be utilized to set the time threshold, e.g., based on a corpus of historic interactions of the user, of other users, or the like, with the GUI of the webpage, with GUIs of other webpages, or the like. In some exemplary embodiments, the predictor may be trained based on the user's behavior, based on behavior of users as a whole, based on behavior of users that are similar to the user, or the like. In some exemplary embodiments, a predictor may be configured to set or adjust a time threshold based on heuristics. For example, the predictor may be configured to determine that an interaction is unintended in case that content of a webpage was revealed to the user for a short period that is below a threshold.

In some exemplary embodiments, a predictor may be trained on a training dataset associated with the user. In some exemplary embodiments, the training dataset may comprise historic user interactions, accumulated data relating to the manner in which content is consumed by the user, or the like. In some exemplary embodiments, the training dataset may comprise data relating to the interactions of the user with browsed webpages and/or application pages, such as typical speed and acceleration of a scrolling activity of the user, eye tracking of the user, cursor movement and actions, keyboard events, or the like. In some exemplary embodiments, the training dataset may be accumulated, gathered, or the like, using one or more video streams of the user, photos of the user while interacting or consuming the content, or the like. In some cases, the predictor may be trained to determine a level of interest of the user in a content item, which may be used to classify interactions as intended or unintended, e.g., employing one or more machine learning techniques.

In some exemplary embodiments, a predictor may be trained to cluster historical patterns of user interactions into a cluster comprising patterns of interactions with desired content and into another cluster comprising patterns of interactions with undesired content. In some exemplary embodiments, upon obtaining a current user interaction, the user interaction may be clustered according to a pattern of the current interaction. A similarity of patterns may be determined by a distance metric such as Euclidean distance metric, Gaussian distance metric, or the like. In some exemplary embodiments, the predictor may profile the user and utilize a clustering algorithm in order to cluster the user to a cluster of users with similar properties, each of which may be associated with a respective time threshold.

In some exemplary embodiments, after an initial time threshold is set, the time threshold may be adjusted, modified, verified, or the like, e.g., iteratively, continuously, periodically, or the like. In some exemplary embodiments, verifying the time threshold may comprise analyzing user interactions with browsed pages using the determined time threshold, and identifying whether unintended user interactions still occur, occur in a lower frequency, occur in a same frequency, occur in a higher frequency, or the like. In some exemplary embodiments, in case that unintentional interactions are determined to still occur in a similar or non-lower frequency, the time threshold may be increased, and vice versa. In some cases, a predictor may be configured to set a different time threshold for a different context of the user, e.g., for a different time of day, for a different estimated mood, for a different estimated mental state of the user, or the like.

It is noted that usage of a time threshold is described herein as a non-limiting example of handling an interaction based on a relative timing of the interaction. In some cases, instead of using a single time threshold, multiple time thresholds may be used to allow a more fine-tuned logic in deciding how to handle an interaction and whether to take a responsive action, whether to override a functionality of a selected content item, or the like. For example, a first time threshold may be used for removing an automatic functionality blockage, a second time threshold may be used to determine whether a user interaction was intended, and a third time threshold may be used to determine whether a previous functionality of a previous item should be implemented. In some cases, no time thresholds may be used explicitly, and instead a client-side logic may consider the elapsed time as one of its inputs to intent estimating function that is configured to decide how to handle user interactions.

On Step 260, in case the elapsed time is determined to be smaller than the time threshold, a functionality of the user interaction may be override. In some exemplary embodiments, determining whether or not to override the functionality may be based on one or more conditions in addition to the time threshold. For example, the determination of whether or not to override the functionality may be based on a confidence score of a classification of the user interaction, e.g., based in the length of the elapsed time. In some cases, the shorter the time between the user interaction and the content switch, the more likely that the user had intended to interact with a previously presented element and had missed the opportunity to do so, which may correspond to a higher confidence score of the unintended interaction, and vice versa.

In some exemplary embodiments, upon selection of the content card, or attempting to do so, the browser or application may be configured to perform one or more functionalities, such as to follow and browse a linked target page, activate a linked functionality, modify a layout of the article, modify a GUI of the browsed page, render target content within the browsed page, or the like. In some exemplary embodiments, upon determining that the elapsed time is lesser than the time threshold, the configured functionality of the browser or application may be overridden, and alternative responsive actions may be executed instead. For example, in response to an attempt of the user to select the content item, the selection functionality may be blocked for one or more clicks, the browser or application may be instructed to ignore a request to navigate to the linked target page, the browser or application may be instructed to ignore a request to activate a functionality of the content card, a request associated with the content card may be blocked and may not reach the browser or application, an automatic blocking of the content item may not be released, or the like.

In some exemplary embodiments, the alternative responsive actions that are executed instead of the configured functionality of the rendering browser or application may comprise disabling at least partially one or more functionalities of the carousel widget, e.g., until a defined event is detected, until a timeout, or the like. For example, clicking on the content card may be disabled until a second click on the content card is obtained, until a defined number of milliseconds or seconds have passed, a combination thereof, or the like. In some exemplary embodiments, the alternative responsive actions may comprise retaining a blockage of one or more functionalities of the carousel widget, e.g., in case an automatic blocking is implemented. For the avoidance of doubt it is noted that in some cases, the disclosed subject matter may be implemented with respect to only some of the possible interactions with the carousel widget. In such cases, the carousel widget may be disabled for certain interactions, while remaining enabled for other interactions.

In some exemplary embodiments, in case the source code or DOM representation of the carousel widget is available and controllable, implementing the alternative responsive actions may comprise disabling the functionality of the carousel widget directly, such as by modifying the source code or DOM representation of the GUI to disable the functionality of the carousel widget, to point to null functionality, or the like. In some exemplary embodiments, in case the source code or DOM representation of the carousel widget is not available and not controllable, implementing the alternative responsive actions may comprise disabling the functionality of the carousel widget indirectly, such as by wrapping or embedding the carousel widget within an auxiliary element, by placing one or more invisible elements on top of the carousel element to effectively disable its area of parts thereof, or the like.

In some cases, the carousel widget may be displayed in a manner that does not indicate that it is disabled. This may occur, for example, in case the carousel widget was configured to point to null functionality, or in case the carousel widget was disabled indirectly. As an example, a link of a content card may not be displayed in a grey coloring of disabled links, and instead, the link may be displayed in a typical non-grey color, e.g., a blue color. As another example, in case a mouse cursor hovers above a disabled element of the carousel element, the cursor may not obtain a visual indication that the carousel element is non-clickable.

In some exemplary embodiments, the alternative responsive actions may comprise performing one or more functionalities that are not associated with the selected content card. In some exemplary embodiments, the one or more functionalities may comprise functionalities of an element that was located in the location of the content card prior to the content switch, e.g., a previous content card, an external GUI element, a portion of the carousel element that is not a content card, or the like. For example, a browser may be instructed to activate a functionality that is associated to the previous content item, an iframe may be loaded and rendered with a functionality that is associated to the previous content item, or the like. As another example, an external GUI element such as a comment widget that was located in the location of the content card prior to the content switch may be activated instead of the selected content card. As another example, portion of the carousel element that is not a content card such as a "like" widget that was located in the location of the content card prior to the content switch may be activated instead of the selected content card.

It is noted that the disclosed subject matter is not limited to an embodiment in which an interaction with the carousel widget triggers a link. In some exemplary embodiments, interacting with the carousel widget may trigger other events, such as but not limited to launching another application, opening another GUI, increasing the size of the carousel, or the like. By increasing the size of the carousel, additional content, such as another article, a video, or the like, may be displayed. The events may be associated with the item that is presently displayed. As an example, the carousel widget may rotate a list of buttons each of having a different functionality defined (e.g., cut, paste, copy). In accordance with the disclosed subject matter, upon clicking on the displayed button, the functionality of the previously displayed button may be performed, no functionality may be performed, the functionality of the displayed button may be performed, or the like, based on the timing of the interaction, the time elapsed since the displayed button replaced the previously displayed button, or the like.

On Step 250, in case the elapsed time is determined to be greater or equal to the time threshold, the functionality of the content card may be enabled, retained, or the like, upon selection thereof. In some exemplary embodiments, upon selecting the content card, the browser or application may be enabled to execute one or more linked functionalities, such as following and browsing a linked target page; displaying content associated with the content item in the same GUI or viewport without browsing to a different page such as via an iframe; changing a content displayed in an article element of the GUI; changing content in other elements of the GUI; playing an audio clip without changing the content displayed in the article element of the GUI; playing a video clip without changing the content, or the like. In some exemplary embodiments, in case of automatic blocking of one or more functionalities of the content card after the content switch, the blocking may be lifted, cancelled, or the like.

In some exemplary embodiments, after performing Step 260 or 250, a predictor may utilize production data that may be reviewed and used to deduce whether the prediction of the user's intent was correct. For example, in case the user has selected a content item but her selection was overridden and blocked by Step 260, and then, as the functionality did not load, the user has selected again on the content item, the predictor may determine that the user did in fact intent to click to content item and that the prediction of the user's intent was inaccurate. From the perspective of the user, clicking twice may be performed intuitively without understanding why the first click or clicks were not handled and potentially without interfering with her overall UX, thus retaining a high level UX of the user. However, the second click may indicate that the first click(s) was indeed intentional, e.g., also in case the threshold has not yet elapsed. In order to prevent further inaccurate predictions, the threshold may be adjusted, decreased, or the like.

In view of the activity of the user after implementing Step 260 or 250, the user interactions may be labeled as "intentional" or "unintentional", and may be added or retained in a training dataset of the predictor. In some exemplary embodiments, the timing of each interaction may be retained in the dataset together with their intent label for training purposes, e.g., in order to dynamically determine or adjust the time threshold according to the user's behavior, with enhanced accuracy.

Figure 2B:
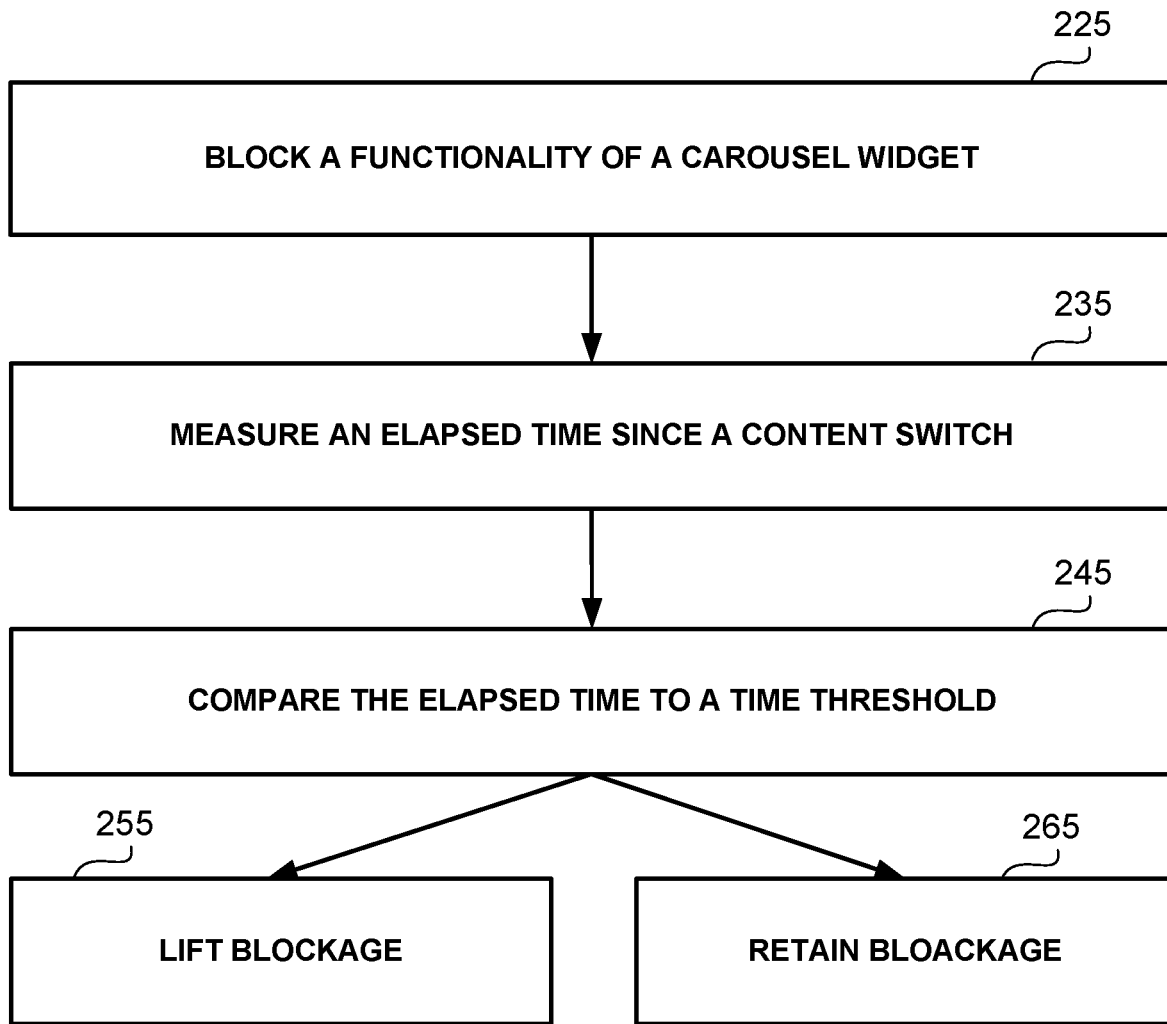

Referring now to FIG. 2B, illustrating a flowchart diagram of a method, in accordance with some exemplary embodiments of the disclosed subject matter.

On Step 225, a functionality of a carousel widget may be partially or fully blocked for user interactions automatically, in response to a content switch process occurring within the carousel widget. In some exemplary embodiments, the content switch may be identified by monitoring the screen of the user, by monitoring requests from the browser, by using an event handler that is registered on events of the carousel widget, or the like. Additionally, or alternatively, the invocation of the content switch may also indicate that the content switch had occurred, such as using a pre-defined API. In some exemplary embodiments, blocking the functionality of the carousel widget may comprise blocking a clicking functionality of one or more portions of the carousel widget, blocking speech commands to one or more portions of the carousel widget, blocking selections of one or more portions of the carousel widget with any other pointing devices, blocking touch selections of one or more portions of the carousel widget, or the like.

In some exemplary embodiments, the blockage of the functionality may be performed in a similar manner as in Step 260 (FIG. 2A).

On Step 235, an elapsed time since the content switch may be recorded, monitored, measured, or the like. In some exemplary embodiments, the elapsed time may be measured since a start of the identified content switch, during which the display of the carousel widget has rotated or replaced one or more content cards within the carousel widget. Additionally, or alternatively, the time measurement may be since the end of the content switch operation, in which the current displayed content card was placed.

On Step 245, the elapsed time may be compared to a time threshold, e.g., in order to determine whether or not the blockage of the functionality of the carousel widget should be released, lifted, or the like. In some exemplary embodiments, in case the elapsed time is determined to be lesser than the time threshold, indicating that the blockage should be retained, the method flow may continue to Step 265. In some exemplary embodiments, in case the elapsed time is determined to be greater or equal to the time threshold, indicating that the blockage should be released, and the blocked functionality should be enabled, the flow of the method may continue to Step 255.

In some exemplary embodiments, in some cases, the method flow may continue to Step 255 even in case the elapsed time is determined to be lesser than the time threshold. For example, in case a difference between the elapsed time and the time threshold is small, e.g., unsignificant, below a threshold, or the like, and one or more defined events have occurred such as obtaining a click or interaction with the carousel widget during the blockage, obtaining multiple clicks or interactions in a defined timeframe, or the like, the method flow may continue to Step 255.

In some exemplary embodiments, the time threshold may be obtained from a remote server, obtained from a component of the user device presenting the carousel widget, or determined locally on the user device. In some exemplary embodiments, the time threshold may be configured to distinguish between a first timeframe before the time threshold, during which a potential user interaction with the carousel widget is estimated to be unintended, and a second timeframe after the time threshold, during which a potential user interaction with the carousel widget is estimated to be intended. In some exemplary embodiments, the time threshold may be set in a similar manner as in Step 240 (FIG. 2A).

On Step 265, in case the elapsed time is determined to be lesser than the time threshold, the blockage may be retained, retaining a disablement of one or more functionalities of the carousel widget. In some exemplary embodiments, the blockage may or may not be configured to be released prior to reaching the time threshold, such as in case of one or more defined user behaviors.

On Step 255, in case the elapsed time is determined to be greater or equal to the time threshold, the blockage may be released, lifted, or the like, and the blocked functionality may be enabled. In some exemplary embodiments, after lifting the blockage of the functionality, the carousel widget may be enabled to function in a similar manner as in Step 250 (FIG. 2A).

Referring now to FIGS. 3A-3D, illustrating an exemplary GUI with a carousel widget, in accordance with some exemplary embodiments of the disclosed subject matter.

Figure 3A:
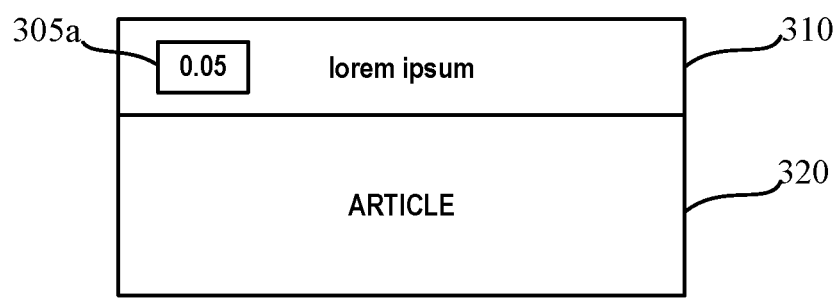
FIGS. 3A-3D illustrate an exemplary GUI with a carousel widget, in accordance with some exemplary embodiments of the disclosed subject matter.

FIG. 3A illustrate a GUI 300 of a browsed webpage, of an application page, or of any other page. In some exemplary embodiments, GUI 300 may comprise a Carousel Widget 310 and an Article 320 (or any other main page content). In some exemplary embodiments, Article 320 may comprise a news article, an image, a story, a webpage, an application page, or the like. Carousel Widget 310 may comprise a carousel GUI element, or any other element enabling a functionality of changing content, a rotating content, or the like. In some exemplary embodiments, Carousel Widget 310 may be utilized to display sequentially a plurality of content cards associated with recommendations, advertisements, GUI controls, or the like. In some exemplary embodiments, Carousel Widget 310 may display content cards that are associated with a content of Article 320, that match a profile of a user that is consuming the content, or the like. In some exemplary embodiments, each content item may comprise a text, images, audio, video, or the like, which may indicate an associated content thereof. In some exemplary embodiments, the content cards associated to Carousel Widget 310 may be modified or rotated periodically, based on instructions of an advertiser, upon identifying an event that changes the user's profile, or the like, enabling a provider of content cards to add, remove or amend the selection of content cards that are configured to be presented by Carousel Widget 310.

In some exemplary embodiments, a display of Carousel Widget 310 may be modified to comprise a Remaining Time Indicator 305*a*. Remaining Time Indicator 305*a* may indicate a remaining time until a next content switch of Carousel Widget 310, e.g., switching between a display of content cards. In some exemplary embodiments, the timing of the content switch may be pre-defined or defined dynamically, in a recurring manner. For example, during a content switch, one or more content cards that are displayed in Carousel Widget 310 may be replaced with one or more next content cards in a sequence. As another example, during a content switch, an order of one or more content cards that are displayed in Carousel Widget 310 may be rotated or otherwise changed. In some exemplary embodiments, Remaining Time Indicator 305*a* may indicate the remaining time to the content switch in a visual or graphical manner, such as but not limited to an hourglass representation, a progress bar that is being filled, a progress bar that is being depleted, a clock image, or the like. In some exemplary embodiments, Remaining Time Indicator 305*a* may indicate the remaining time in a non-visual manner such as via a text indication, an audio indication, or the like. For example, Carousel Widget 310 may generate a sound that has a frequency or beat that corresponds to the remaining time until a content switch, e.g., increasing a beat as the content switch nears. As illustrated in FIG. 3A, Remaining Time Indicator 305*a* may state the remaining time with a textual cue, textually indicating that the display of Carousel Widget 310 will change in 50 milliseconds or in any other future time.

Figure 3B:
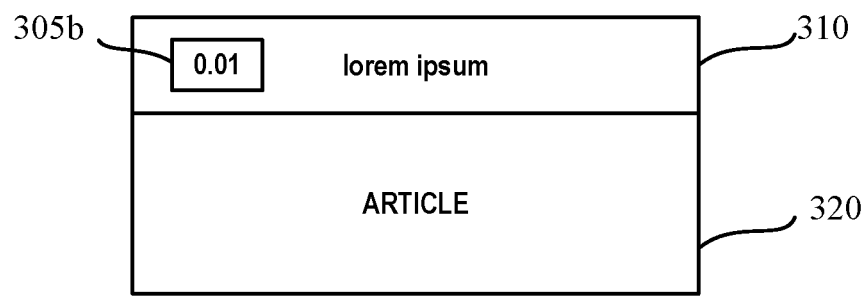

FIG. 3B illustrates a GUI 301 with Carousel Widget 310 and an Article 320 that may correspond to the Carousel Widget 310 and an Article 320 of FIG. 3A, after 40 milliseconds or any other time units have elapsed. In some exemplary embodiments, GUI 301 may comprise Remaining Time Indicator 305*b* that may indicate a remaining time until a content switch of Carousel Widget 310. In some exemplary embodiments, in case 40 milliseconds have elapsed from the state of FIG. 3A, Remaining Time Indicator 305*b* may be updated to reflect that the content of Carousel Widget 310 is configured to switch in 10 milliseconds. In some exemplary embodiments, Remaining Time Indicator 305*b* may be updated periodically, continuously, according to a clock, or the like.

Figure 3C:
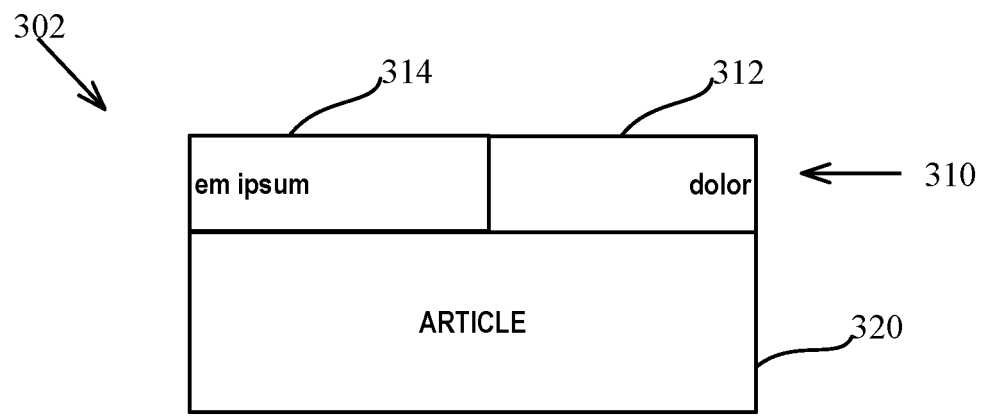

FIG. 3C illustrates a GUI 302 with Carousel Widget 310 and an Article 320 that may correspond to the Carousel Widget 310 and an Article 320 of FIG. 3B, after additional time has elapsed and a content switch has begun. In some exemplary embodiments, GUI 302 illustrates a content switch that is configured to switch between a previously presented Content Item 314, and a next content card, e.g., Content Item 312. In some exemplary embodiments, the content switch may be triggered after the time indicated by Remaining Time Indicator 305*b* (FIG. 3B) has elapsed, e.g., upon arriving to the defined time. In some exemplary embodiments, Carousel Widget 310 may perform the content switch immediately, or gradually. In some exemplary embodiments, a gradual content switch may utilize an animation or other effect that may visually indicate that Content Item 314 that was previously shown is being replaced by a different content item, e.g., Content Item 312. In some exemplary embodiments, a gradual content switch may gradually replace Content Item 314 with Content Item 312 in a visual manner, which may be perceived by the user and reduce the risk of unintended interactions. As is exemplified in FIG. 3C, during the content switch process, both content items may be displayed, in a partial or full manner, providing additional time for the user to select the previous content card. In some exemplary embodiments, during the content switch, a remaining time indicator may not be presented, as a count until the next content switch does not start until the current content switch ends.

Figure 3D:
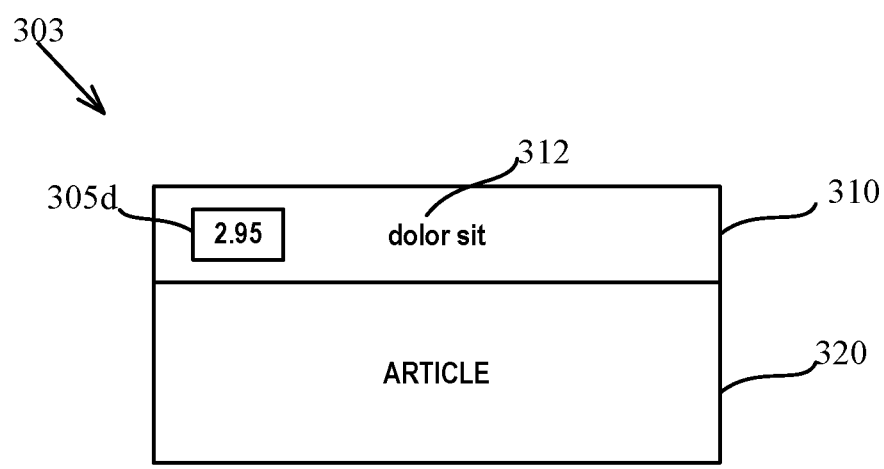

FIG. 3D illustrates a GUI 303 with Carousel Widget 310 and an Article 320 that may correspond to the Carousel Widget 310 and an Article 320 of FIG. 3C, after the content switch process is completed, concluded, or the like. In some exemplary embodiments, the content switch may update the presented content of Carousel Widget 310 to present Content Item 312 instead of Content Item 314, e.g., in a full display of Carousel Widget 310. In other cases, both Content Items 312 and 314 may be presented together in Carousel Widget 310, and the content switch may merely switch an order between them or change them with multiple next content cards. In some exemplary embodiments, GUI 303 may comprise a Remaining Time Indicator 305d, which may indicate the remaining time until the currently displayed content of Carousel Widget 310, e.g., Content Item 312, is to be replaced by a next content item.

In some exemplary embodiments, the switching manner and presentation may affect a classification of a user intent. In some exemplary embodiments, in case a remaining time indicator is used, and/or the switching is performed in a gradual manner, the probability that the user selected the next content card unintendedly may be reduced. For example, in case of the switching of FIG. 3C, the user may be prepared ahead of time that a content switch will be performed, may perceive the gradual switch, and may intentionally select Content Item 312. In some exemplary embodiments, a classifier or predictor such as the predictor described in Step 240 (FIG. 2A) or a predictor implementing one or more processes described in Step 240 (FIG. 2A) may determine a threshold while taking into account the switching manner and presentation that is used.

In some exemplary embodiments, the next content item may be selected from a set of content items that are associated with Carousel Widget 310, and that Carousel Widget 310 is configured to present. In some exemplary embodiments, a next content item may be selected to be presented sequentially according to an order, based on real time events, or the like. For example, Carousel Widget 310 may be configured to present content items according to a defined order of a set of content items. In case the set comprises only Content Item 312 and Content Item 314, the next content item may comprise Content Item 314. As another example, Carousel Widget 310 may be configured to present content items according to a real time event, regardless of an order of content items. For example, a next item may be selected based on a user interaction that indicates a user interest that can be matched with a content item.

Referring now to FIGS. 4A-4E, illustrating exemplary user interactions with a GUI over time, in accordance with some exemplary embodiments of the disclosed subject matter.

Figure 4A:
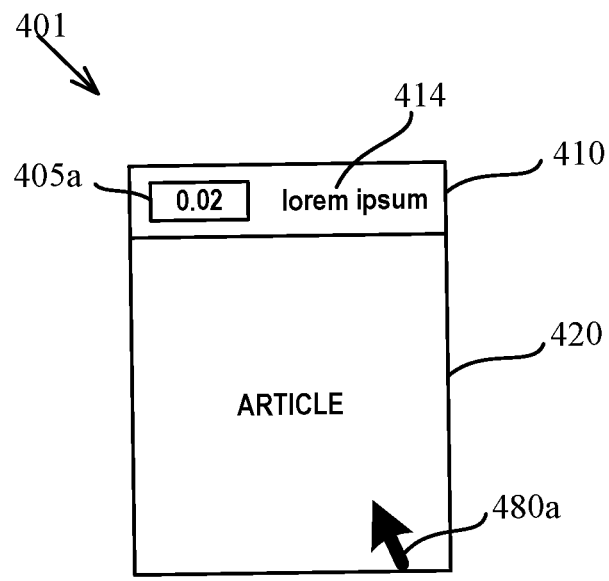
FIGS. 4A-4E illustrate exemplary user interactions with a GUI over time, in accordance with some exemplary embodiments of the disclosed subject matter.

FIG. 4A illustrates a GUI 401 with Carousel Widget 410 and an Article 420. In some exemplary embodiments, Carousel Widget 410 may comprise a carousel element showing rotating content items, which may correspond to Carousel Widget 310 (FIGS. 3A-3D). In some exemplary embodiments, Carousel Widget 410 may comprise a current content item, e.g., Content Item 414, and a Remaining Time Indicator 405a, which may indicate a remaining time until a content switch of Carousel Widget 410. In some exemplary embodiments, by indicating to the user the remaining time, the likelihood that the user will select Carousel Widget 410 shortly after the item of interest is replaced may be reduced. In some exemplary embodiments, GUI 401 may comprise a Cursor 480a, which may correspond to a mouse cursor, a finger movement over a touch screen, a focus of gaze of the user, an intent of the user, or any other pointing or selecting means. In some cases, Cursor 480a may be displayed visually on GUI 401, while in other cases, Cursor 480a may not be visually displayed and may be depicted herein for illustration purposes only.

In some exemplary embodiments, FIG. 4A may illustrate an initial state during which a user may decide to reach out to Content Item 414 and attempt to select Carousel Widget 410, select Content Item 414 within Carousel Widget 410, or the like. For example, the user may scroll up in order to reach out to Content Item 414 as it may wish to consume content of a content page that is associated with Content Item 414.

Figure 4B:
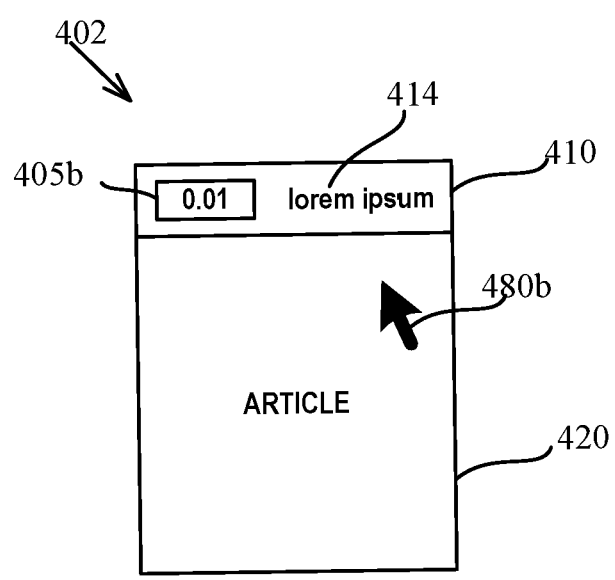

FIG. 4B illustrates a GUI 402 with Carousel Widget 410 and an Article 420 that may correspond to the Carousel Widget 410 and an Article 420 of FIG. 4A, in a subsequent timeframe. In some exemplary embodiments, GUI 402 may comprise a Cursor 480b, which may correspond to Cursor 480a (FIG. 4A) after Cursor 480a has been moved up to the direction of Content Item 414. As illustrated in FIG. 4B, as the user decided to select Content Item 414 from Carousel Widget 410, the user may move Cursor 480b to the direction of the Content Item 414, as depicted in FIG. 4B.

In some exemplary embodiments, before the user is able to interact with Carousel Widget 410, a content switch may be triggered, e.g., as indicated by Remaining Time Indicator 405b that may show that a remaining time is limited. In some exemplary embodiments, Remaining Time Indicator 405b of Carousel Widget 410 may indicate that a next content switch will occur in an indicated amount of time, such as 0.02 time units, milliseconds, or the like, which may be a short time that may not be sufficient for moving Cursor 480b to Carousel Widget 410 and interacting with Carousel Widget 410. In some exemplary embodiments, the speed of the movement of Cursor 480b may enable Cursor 480b to reach Carousel Widget 410 only after the content switch is triggered, in case the speed is linear.

Figure 4C:
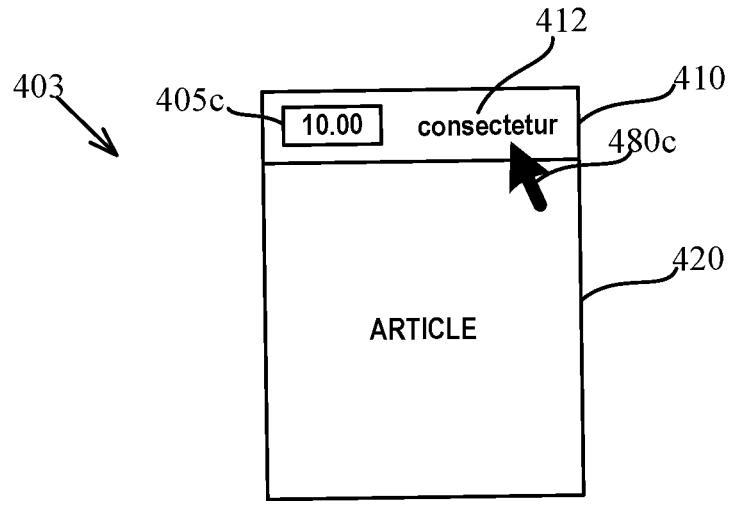

FIG. 4C illustrates a GUI 403 with Carousel Widget 410 and an Article 420 that may correspond to the Carousel Widget 410 and an Article 420 of FIG. 4B, in a subsequent time period. In some exemplary embodiments, GUI 403 may comprise a Cursor 480c, which may correspond to Cursor 480b (FIG. 4B) after Cursor 480b has reached Carousel Widget 410. In some exemplary embodiments, as the content switch may be already partially or fully performed, the user may miss the opportunity to interact with Content Item 414, and may attempt to interact instead with Content Item 412, unintendedly.

In some exemplary embodiments, in case that automatic blocking is implemented, an elapsed time since the content switch may be measured and compared to a threshold. In case the elapsed time is lesser than the threshold, the blockage may be retained, preventing the user from interacting with Content Item 412 until the threshold has passed. In case the elapsed time is greater than the threshold, the blockage may be lifted, enabling the user to interact with Content Item 412.

In some exemplary embodiments, in case that automatic blocking is not implemented, a time between the content switch and the attempted interaction with Content Item 412 may be measured and compared to a defined threshold, to estimate whether the interaction with Content Item 412 was intended. In some exemplary embodiments, in case the measured time is below the threshold, the interaction may be deemed unintended, and one or more mechanisms may be used to block a functionality of Content Item 412, of Carousel Widget 410, or the like, to disabled Content Item 412 for one or more interaction types, or the like. For example, Content Item 412 may be locked for clicks for a certain time period, until occurrence of an event such as obtaining a second or third user click, a separate click that is not a double click, or the like. After a defined time period had passed, such as 400 milliseconds, Carousel Widget 410 or portions thereof may be configured to be enabled for interaction once again.

In some exemplary embodiments, in case the measured time between the content switch and the attempted interaction with Content Item 412 is below the threshold, one or more alternative functionalities may be performed. For example, a previous content item, e.g., Content Item 414, which was presented in the clicked area before the content change, may be activated instead of the clicked content item, e.g., Content Item 412.

Figure 4D:
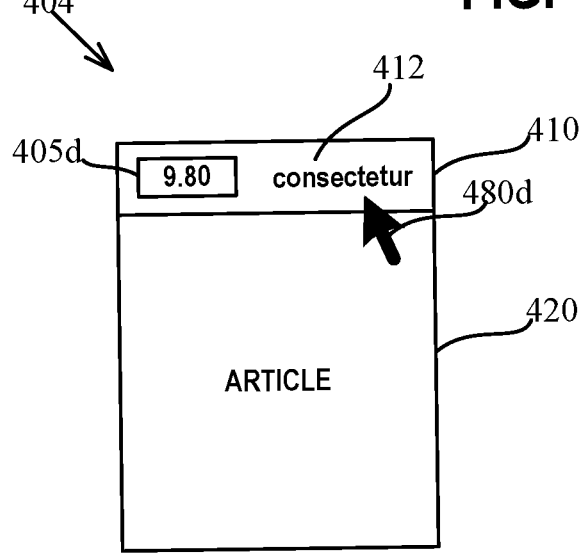

FIG. 4D illustrates a GUI 404 that corresponds to GUI 403 (FIG. 4C) during a full or partial blockage of a functionality of Content Item 412, e.g., after an attempt of the user to interact with Content Item 412, prior to the attempt of the user to interact with Content Item 412, or the like. In some exemplary embodiments, during the functionality blocking of Carousel Widget 410, Carousel Widget 410 may be visually identical to Carousel Widget 410 in its enabled state, without enabling a user to perceive that the functionality is fully or partially blocked. In some exemplary embodiments, both the disabled and enabled states may be displayed in an identical manner. Alternatively, a visual indication may be used to indicate that the functionality is blocked.

In some exemplary embodiments, in case the user intended to interact with Content Item 412, the user may be unaware that the interaction is intercepted, that Content Item 412 has been disabled for interactions, or the like. In some exemplary embodiments, in case the functionality of Content Item 412 is not activated upon the first user interaction of Cursor 480*d* therewith, the user may perform a second interaction with Content Item 412, such as by intuitively performing a second click with Cursor 480*d*, which may unlock or enable the functionality of Content Item 412. Alternatively, the second click of Cursor 480*d* may not enable the functionality of Content Item 412, and the functionality of Content Item 412 may be enabled after expiration of a defined time period, upon identification of an event, or the like.

Figure 4E:
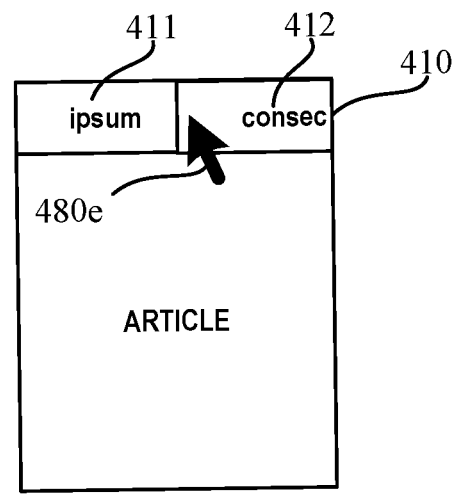

FIG. 4E illustrates an exemplified GUI 405 that corresponds to GUI 404 (FIG. 4D), during a subsequent content switch between Content Item 411 and Content Item 412 in Carousel Widget 410. In some exemplary embodiments, the content switch depicted by FIG. 4E may visually demonstrate a linear or gradual content switch, during which a widget of Content Item 412 is slowly replaced with a next content item, e.g., Content Item 411, in a continuous linear movement. In some exemplary embodiments, the gradual content switch may reduce a possibility of unintended functionality. For example, in case the user selects Content Item 412 prior to the content switch being triggered from left to right, Content Item 412 may be still selected in case Cursor 480*e* is not placed in the most left corner of Carousel Widget 410, and vice versa: in case the content switch is triggered from right to left, Content Item 412 may be still selected in case Cursor 480*e* is not placed in the most right corner of Carousel Widget 410. In some exemplary embodiments, the slower the speed of the content switch, the less likely is the user to unintendedly select Content Item 411.

Figure 5A:
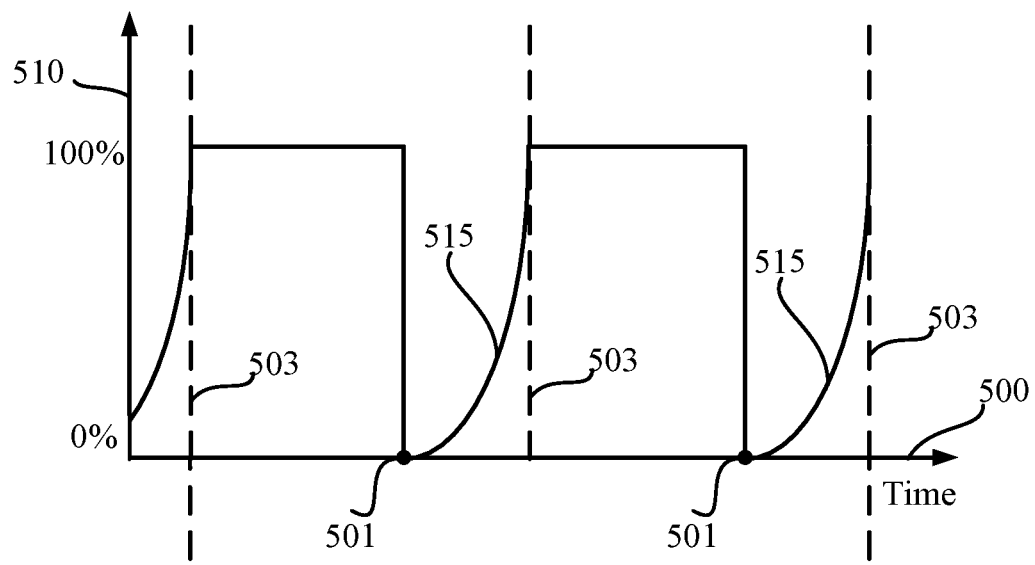
FIGS. 5A-5B illustrate exemplary charts, in accordance with some exemplary embodiments of the disclosed subject matter.
Figure 5B:
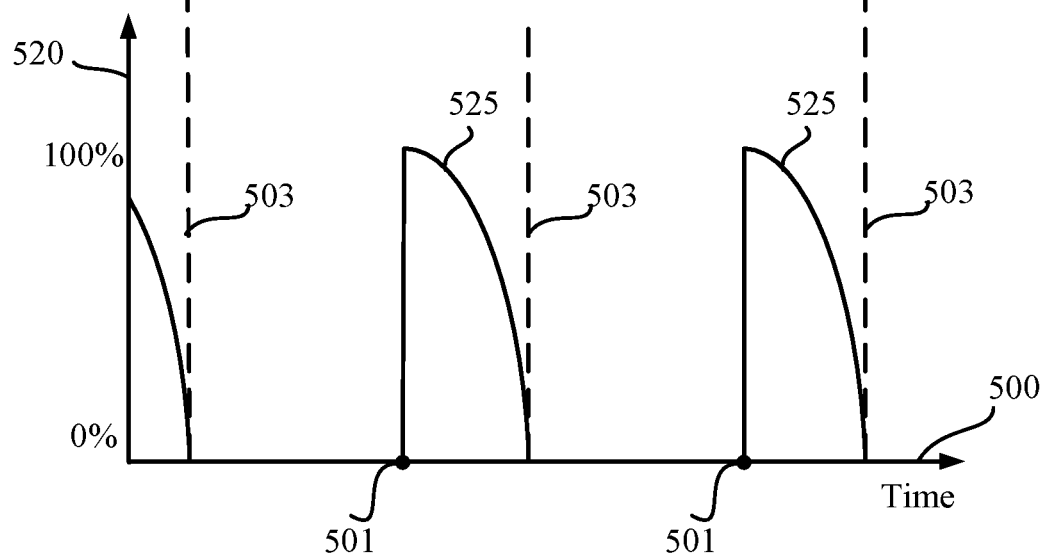

Referring now to FIGS. 5A-5B, illustrating exemplary charts, in accordance with some exemplary embodiments of the disclosed subject matter.

FIG. 5A illustrates a chart of Clicking Intent 510 over Time 500. As illustrated in FIG. 5A, a Content Switch 501 occurs periodically, for a short or long time duration. For example, each Content Switch 501 may switch a content card immediately, e.g., during a single time unit, or gradually, e.g., for 2-3 seconds. In some cases, a Time Threshold 503 that is relative to each Content Switch 501 may be obtained, and may indicate an estimated end of an unintended time period during which an intent of any user interaction with the carousel widget after Content Switch 501, may be estimated to be unintended.

In some cases, a Probability 515 may indicate a probability that user interactions with the carousel element are intentional. As illustrated in FIG. 5A, immediately after each Content Switch 501, Probability 515 may be zero or close to zero, since the user may not have sufficient time to notice the content switch and change her reaction. As the time passes, the Probability 515 that the user intentionally selected or clicked the carousel element may increase, until reaching a 100% probability or a near to 100% probability, until a next Content Switch 501.

In some cases, although the Time Threshold 503 is illustrated in FIG. 5A as correlating to a Probability 515 of 100% of being intentional, the Time Threshold 503 may correlate to any other area of Probability 515 to the left of the current position of Time Threshold 503. For example, the Time Threshold 503 may be set to be nearer or in a closer proximity to each Content Switch 501, corresponding to a shorter elapsed timeframe, such as in case it correlates to a Probability 515 of 80% of being intentional, or to any other determined probability that corresponds to an elapsed timeframe from each Content Switch 501.

In some exemplary embodiments, the elapsed time from a Content Switch 501 to a user interaction attempt, or to a current time, may be measured and compared to Time Threshold 503. In a first scenario, interactions with the carousel element may be automatically blocked a-priori upon each Content Switch 501 until the elapsed time reaches the Time Threshold 503. In a second scenario, interactions with the carousel element may be selectively prevented posteriori upon determining that the elapsed time from the last Content Switch 501 is lesser than the Time Threshold 503. In some cases, both scenarios may utilize the same Time Threshold 503, or a different Time Threshold 503. For example, the first scenario may utilize a Time Threshold 503 that corresponds to a timeframe of 56 milliseconds and to a 78% probability of Probability 515, while the second scenario may utilize a Time Threshold 503 that corresponds to a timeframe of 70 milliseconds and to a 95% probability of Probability 515.

FIG. 5B illustrates a chart of a Previous Intent 520 over Time 500, indicating a probability that a user intended to select a previous element that was presented in the location that was selected by the user prior to the previous Content Switch 501. In some exemplary embodiments, the Content Switches 501 and Time Thresholds 503 may or may not correspond to those of FIG. 5A. In some exemplary embodiments, a Probability 525 may indicate a probability that user interactions with the carousel element intended to select a previous element that was presented in the location that was selected by the user prior to the last nearest Content Switch 501.

As illustrated in FIG. 5B, immediately upon Content Switch 501, Probability 525 may be 100%, as the user may not have sufficient time to notice the content switch and change her reaction, indicating that the user intended to select an item that was previously located in the selected area. As the time passes, the Probability 525 that the user intentionally selected or clicked the previously presented element may decrease, as the user may have sufficient time to notice the change in her viewport, until reaching a probability of 0% or near 0%. Every new Content Switch 501 may increase the probability that the user intended to select the previous item to 100% or near.

In some exemplary embodiments, assuming the user's selection was intended, the Probability 525 may oppositely correlate to Probability 515 (FIG. 5A), as the probability that the user intended to select a previous element (Probability 525) may be equal to 1-P, where P denotes the probability that the user intended to select the current element (Probability 515).

In some cases, although the Time Threshold 503 is illustrated as correlating to a Probability 525 of 0% or near 0% of intending to select a previous item, the Time Threshold 503 may correlate to any other area of Probability 525 to the left of the 0% probability. For example, the Time Threshold 503 may be set to a shorter timeframe that is nearer to each Content Switch 501, such as in case it correlates to a Probability 525 of 20% of intending to select a previous item. In this example, interaction attempts of a user that have a Probability 525 that is greater than 20% may be determined to be interactions that intend to select the previous item, while interactions attempts of a user that have a Probability 525 of 20% or less, e.g., after the threshold of 20%, may be determined to be interactions that intend to select the current item.

In some exemplary embodiments, the elapsed time from a Content Switch 501 to a user interaction attempt, may be measured and compared to Time Threshold 503. In some cases, upon determining that the elapsed time is lesser than the Time Threshold 503, a functionality of a previous item may be implemented, activated, triggered, or the like. In some cases, upon determining that the elapsed time is greater than the Time Threshold 503, a functionality of a current item may be enabled to be activated, may not be blocked, or the like.

Figure 6:
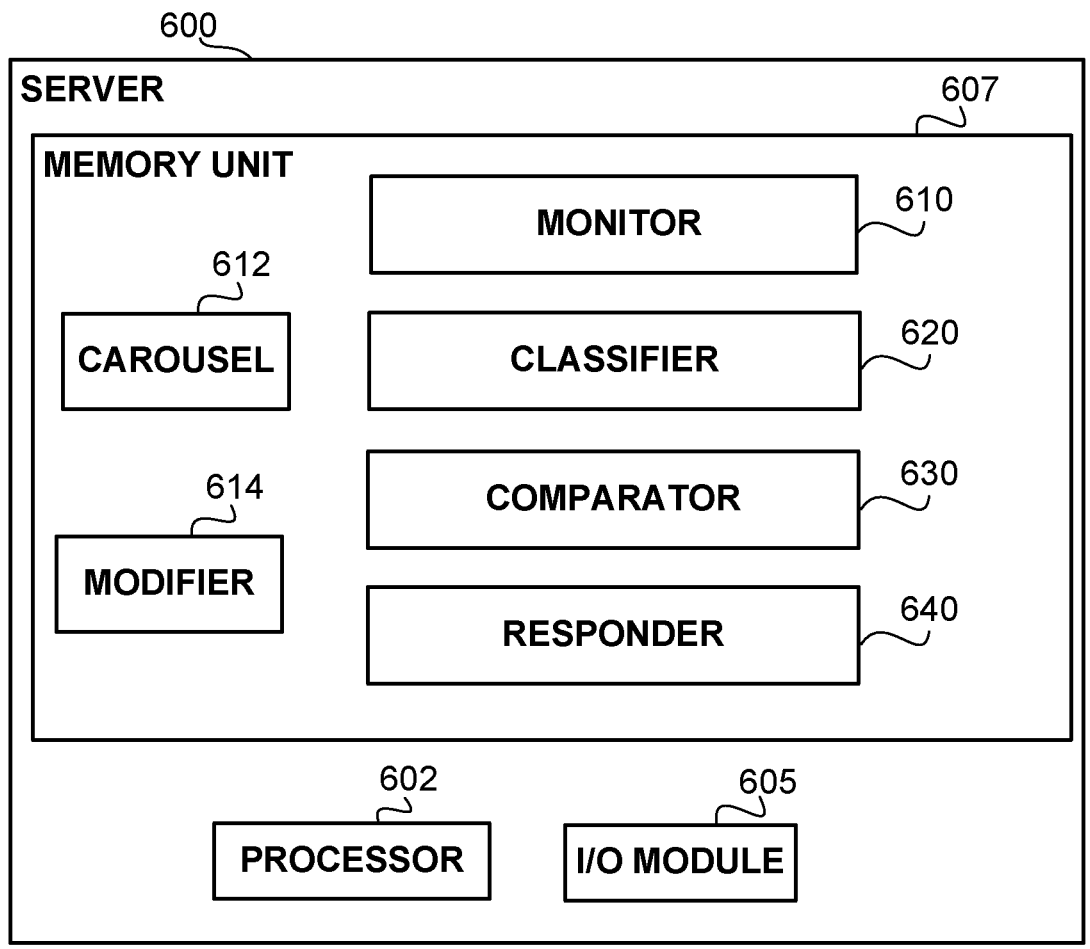
FIG. 6 illustrates a block diagram of an apparatus, in accordance with some exemplary embodiments of the disclosed subject matter.

Referring now to FIG. 6 illustrating a block diagram of an apparatus, in accordance with some exemplary embodiments of the disclosed subject matter.

In some exemplary embodiments, Apparatus 600 may comprise a Processor 602. Processor 602 may be a Central Processing Unit (CPU), a microprocessor, an electronic circuit, an Integrated Circuit (IC) or the like. Processor 602 may be utilized to perform computations required by Apparatus 600 or any of its subcomponents. Processor 602 may be configured to execute computer-programs useful in performing the method of FIGS. 2A-2B, or the like.

In some exemplary embodiments of the disclosed subject matter, an Input/Output (I/O) Module 605 may be utilized to provide an output to and receive input from a user such as via user interactions. I/O Module 605 may be used to transmit and receive information to and from the user or any other apparatus, e.g., one or more servers such as Server 130 (FIG. 1), that may be in communication therewith.

In some exemplary embodiments, Apparatus 600 may comprise a Memory Unit 607. Memory Unit 607 may be a short-term storage device or long-term storage device. Memory Unit 607 may be a persistent storage or volatile storage. Memory Unit 607 may be a disk drive, a Flash disk, a Random Access Memory (RAM), a memory chip, or the like. In some exemplary embodiments, Memory Unit 607 may retain program code operative to cause Processor 602 to perform acts associated with any of the subcomponents of Apparatus 600. In some exemplary embodiments, Memory Unit 607 may retain program code operative to cause Processor 602 to perform acts associated with any of the steps in FIGS. 2A-2B, or the like.

The components detailed below may be implemented as one or more sets of interrelated computer instructions, executed for example by Processor 602 or by another processor. The components may be arranged as one or more executable files, dynamic libraries, static libraries, methods, functions, services, or the like, programmed in any programming language and under any computing environment.

In some exemplary embodiments, Monitor 610 may be configured to monitor content switches of Carousel Element 612, within a computerized environment in which one or more carousel widgets such as Carousel Element 612 are displayed to a user. In some exemplary embodiments, Carousel Element 612 may display at least one content card. In some exemplary embodiments, Monitor 610 may be configured to monitor content switches in Carousel Element 612, e.g., in which a previous content card presented by Carousel Element 612 is replaced with a next content card to be presented within Carousel Element 612, in which locations of content items are swapped, or the like.

In some exemplary embodiments, the disclosed subject matter may be utilized with respect to a content switch that places a content card of Carousel Element 612 or any other GUI element over other elements whose location or appearance may be modified over time. As an example, a first element in a web page may be displayed initially in a first location, and after another element such as Carousel Element 612 is rendered and displayed, the location of the first element may change. As an example, an image that may be located above the first element may initially not be displayed until loaded. When the image is loaded, the location of the first element may change, such as it may be pushed downwards, thus changing the user's viewport. As another example, a modification of a location of an element may be the outcome of an interaction by the user, such as clicking a button which causes another element to be displayed. As an example, a web page may include a table which may be expanded or collapsed. Based on a user interaction, the table may be expanded, thus displaying table elements that were previously hidden from view (and potentially loaded for the first time from a server). The displaying of the previously hidden elements may cause other elements to change their respective locations, to be pushed out of the viewport, or the like.

In some exemplary embodiments, upon identifying a content switch, Monitor 610 may be configured to measure or obtain a timeframe measuring a time since a content switch of the carousel widget until an elapsed timeframe reached a threshold. In some exemplary embodiments, Monitor 610 may measure the timeframe to include a time since the content switch of Carousel Element 612 until a current time, e.g., in order to determine whether the elapsed time reached a threshold such as in a case that automatic blocking of a functionality of Carousel Element 612 is implemented.

In some exemplary embodiments, upon identifying a content switch, Monitor 610 may be configured to measure or obtain a timeframe measuring a time since a content switch of Carousel Element 612 until a user interaction with Carousel Element 612. In some exemplary embodiments, Monitor 610 may identify a user interaction with the next content card after the content switch. In some exemplary embodiments, Monitor 610 may determine a timeframe that measures the time between the content switch and the user interaction with the next content card. For example, Monitor 610 may set a timer upon identifying a content switch, and in case a user interaction is subsequently identified with Carousel Element 612, terminate the timer with the user interaction. In some exemplary embodiments, Monitor 610 may be configured to monitor user interactions with a display of a browsed page such as cursor movements, scrolling down and up, a speed of scrolling, a direction of scrolling, a vision focus, or the like. In some exemplary embodiments, the interactions may be monitored via I/O Module 605 or any other component of Apparatus 600, of a device housing Apparatus 600, sensors of a device housing Apparatus 600 such as a camera, or the like. In some exemplary embodiments, Monitor 610 may be configured to monitor a user interaction with a Carousel Element 612 that may be browsed and rendered to view by the browser, by an application, or the like.

In some exemplary embodiments, Classifier 620 may be configured to set a time threshold. In some exemplary embodiments, the time threshold may be used for differentiating between identified or potential user interaction that occur between the content switch and the threshold, which may be estimated to be unintended, and between identified or potential user interaction that occur after the threshold, which may be estimated to be intended. In some exemplary embodiments, Classifier 620 may set the time threshold based on the user interactions monitored by Monitor 610, based on historic user interactions monitored by Monitor 610, based on a context of the user interactions monitored by Monitor 610 or by any other component, based on historic user interactions of the user obtained from Monitor 610 or a different component other than Monitor 610, based on historic user interactions of other users that may or may not share one or more attributes with the user, or the like. For example, Classifier 620 may set a time threshold for determining an intent of the user interaction based on historic user interactions with a browser or application rendering Carousel Element 612, e.g., based on average response times of the user, based on a variance of averages, or the like. In some exemplary embodiments, Classifier 620 may set the threshold to differentiate between a first time period from the content switch until the threshold in which user interactions are classified as unintended, and a second time period after the threshold elapsed in which user interactions are classified as intended. In some exemplary embodiments, Classifier 620 may set a single threshold for both ending an automatic blockage and classifying user interactions. In some exemplary embodiments, Classifier 620 may set a different threshold for ending an automatic blockage and for classifying user interactions.

In some exemplary embodiments, Classifier 620 may set the threshold once, periodically, dynamically, or the like. In some exemplary embodiments, after determining an initial time threshold, Classifier 620 may or may not adjust the time threshold, e.g., based on newly identified user interactions monitored by Monitor 610, a changing context of a session, or the like.

In some exemplary embodiments, Comparator 630 may obtain the timeframe measurement content switch from Monitor 610, and obtain a time threshold from Classifier 620. In some exemplary embodiments, Comparator 630 may compare between the timeframe and the time threshold, to determine whether or not one or more responsive actions should be performed. In some exemplary embodiments, a responsive action may comprise blocking a functionality that is associated with the content card, releasing a blockage of the functionality, or the like.

In some exemplary embodiments, Responder 640 may be configured to implement a responsive action based on the comparison of Comparator 630, e.g., based on the estimated user intent or elapsed time that is inferred from the comparison. In some exemplary embodiments, the responsive action may comprise blocking a functionality that is associated with the content card, performing a functionality that is associated with the previous content card, or the like. In some exemplary embodiments, a functionality of the cards may comprise navigating to a target resource, navigating to a target webpage, activating a media file, rendering a target resource within a browsed page presenting Carousel Element 612, executing a client code associated with the card, or the like.

In some exemplary embodiments, in case that the comparison compares a timeframe since the content switch of Carousel Element 612 until a current time with a threshold, to identify whether an automatic blockage that prevents a-priori user interactions with Carousel Element 612 can be lifted, Responder 640 may configure the responsive action to comprise releasing a blockage of the functionality in case comparison indicates that the timeframe is greater than or equal to the threshold. In some exemplary embodiments, in case the comparison indicates that the timeframe is lesser than the time threshold, the blockage of the carousel widget may be retained.

In some exemplary embodiments, in case that the comparison compares a timeframe since the content switch of Carousel Element 612 until a subsequent user interaction with Carousel Element 612 after the content switch with a threshold, Responder 640 may configure the responsive action to comprise selectively blocking a functionality that is associated with the content card posteriori, in case the timeframe is determined to be lesser than the time threshold. In some exemplary embodiments, in case the timeframe is determined to be lesser than the time threshold, the user interaction with Carousel Element 612 may be classified as an unintended user interaction. In some exemplary embodiments, in case the timeframe is determined to be greater than the time threshold, or equal thereto, the user interaction with Carousel Element 612 may be classified as an intended user interaction.

In some exemplary embodiments, a user interaction with an element whose location was changed may be classified as an unintended interaction which may be identified and processed in accordance with the disclosed subject matter, e.g., based on the comparison from Comparator 630. In some exemplary embodiments, the identification of the intended or unintended nature of the interaction at Responder 640 may be based on the timing of the interaction, the relative location of the interaction within the interacted-element, the relative location of the interaction within a content item within a widget, or the like.

In some exemplary embodiments, in case the comparison from Comparator 630 indicates that the responsive action comprises blocking the functionality of the current content card in Carousel Element 612, Responder 640 may block the functionality of the content card by blocking an attempted navigation to a target resource of the content card, blocking an attempted navigation to a target webpage of the content card, blocking an attempted activation of a media file of the content card, blocking an attempted rendering of a target resource of the content card within a browsed page presenting Carousel Element 612, blocking an attempted execution of a client code associated with the card, or the like. In some exemplary embodiments, the same blocking may occur in case of automatic blocking that is performed automatically upon identifying a content switch.

In some exemplary embodiments, Responder 640 may implement the blocking directly in the binary, source code, DOM representation, or the like, of Carousel Element 612, by directly blocking an associated functionality. In some exemplary embodiments, Responder 640 may utilize the source code to configure Carousel Element 612 to be unclickable, to configure Carousel Element 612 to point to a null functionality, or the like. In some exemplary embodiments, Responder 640 may implement the blocking indirectly, such as by wrapping Carousel Element 612 within an auxiliary element, displaying one or more transparent elements over Carousel Element 612, or the like.

In some exemplary embodiments, Responder 640 may implement a blockage lifting directly in the binary, source code, DOM representation, or the like, of Carousel Element 612, by directly unblocking an associated functionality. In some exemplary embodiments, Responder 640 may utilize the source code or DOM representation to configure Carousel Element 612 to be clickable, to configure Carousel Element 612 to point to its functionality, or the like. In some exemplary embodiments, Responder 640 may implement the blockage lifting indirectly, such as by unwrapping Carousel Element 612 from an auxiliary element, removing one or more transparent elements that were placed over Carousel Element 612, or the like.

In some exemplary embodiments, in case the comparison from Comparator 630 indicates that the responsive action comprises performing a functionality that is associated with the first content card that was presented in Carousel Element 612 prior to the content switch, in addition to or instead of blocking the functionality of the current content card in Carousel Element 612, Responder 640 may implement one or more functionalities that are associated with the first content card. For example, Responder 640 may navigate the user to a target resource defined by the first content card, may activate a media file defined by the first content card, may render a target resource defined by the first content card within a browsed page rendering Carousel Element 612, or the like.

In some exemplary embodiments, Modifier 614 may be configured to modify an appearance of Carousel Element 612 in one or more ways. In some exemplary embodiments, Modifier 614 may modify a display of Carousel Element 612 to indicate information that may reduce unintended interactions of the user. In some exemplary embodiments, Modifier 614 may modify a display of Carousel Element 612 to include an indication of a remaining time until a next content switch of the carousel widget. In some exemplary embodiments, the indication may comprise a visual indication, a textual indication, an audio indication, or the like. In some exemplary embodiments, Modifier 614 may modify a display of Carousel Element 612 to perform a gradual content switch in one or more gradual speeds.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method implemented in a computerized environment in which a carousel widget is displayed to a user, wherein the carousel widget displays a content card, wherein the carousel widget is configured to periodically perform content switches to change displayed content of the carousel, the method comprising:
    obtaining a timeframe measuring a time since a content switch of the carousel widget, wherein the content switch comprises switching a first content card with the content card, wherein prior to the content switch, the carousel widget displayed the first content card;
    comparing the timeframe to a time threshold; and
    based on said comparing, determining whether or not to perform a responsive action, wherein the responsive action comprises blocking a functionality that is associated with the content card or releasing a previously set blockage of the functionality.

2. The method of claim 1, wherein the timeframe measures a time since the content switch of the carousel widget until a subsequent user interaction with the carousel widget after the content switch, whereby selectively preventing user interactions with the carousel widget posteriori.

3. The method of claim 1, wherein the timeframe measures a time since the content switch of the carousel widget until a current time, whereby user interactions with the carousel widget are a-priori prevented.

4. The method of claim 1, wherein the functionality that is associated with the content card comprises at least one of the group consisting of:
    navigating to a target resource,
    activating a media file, and
    rendering a resource within a browsed page presenting the carousel widget.

5. The method of claim 1, wherein said blocking the functionality comprises wrapping the carousel widget within an element, wherein the element is configured to intercept interaction events with the carousel widget.

6. The method of claim 1, wherein said blocking the functionality comprises displaying one or more transparent elements over the carousel widget, whereby effectively disabling user interaction with the carousel widget.

7. The method of claim 1, wherein said blocking the functionality comprises configuring the carousel widget to be unclickable, or configuring the carousel widget to point to a null functionality.

8. The method of claim 1, wherein the responsive action comprises performing a functionality that is associated with the first content card.

9. The method of claim 7, wherein the functionality that is associated with the first content card comprises at least one of the group consisting of:

navigating to a target resource defined by the first content card, activating a media file defined by the first content card, and rendering a resource, which is defined by the first content card, within a browsed page rendering the carousel widget.

10. The method of claim 1, wherein:

the timeframe is a time elapsed since the content switch and until a current time, and said determining whether or not to perform the responsive action comprises determining not to perform the responsive action in case said comparing indicates that the timeframe is lesser than the time threshold.

11. The method of claim 1, wherein:

the timeframe is a time elapsed since the content switch and until a current time, and said determining whether or not to perform the responsive action comprises determining to perform the responsive action in case said comparing indicates that the timeframe is greater than the time threshold, wherein the responsive action comprises said releasing the blockage of the functionality.

12. The method of claim 1, wherein the carousel widget comprises an indication of a remaining time until a next content switch of the carousel widget.

13. The method of claim 12, wherein the indication comprises a visual indication or a textual indication.

14. The method of claim 1 further comprising setting the time threshold based on historic user interactions.

15. An apparatus comprising a processor and coupled memory, said processor being adapted to:

obtain a timeframe measuring a time since a content switch of a carousel widget, wherein the carousel widget displays a content card to a user, wherein the carousel widget is configured to periodically perform content switches to change displayed content of the carousel, wherein the content switch comprises switching a first content card with the content card, wherein prior to the content switch, the carousel widget displayed the first content card;

compare the timeframe to a time threshold; and based on said comparing, determine whether or not to perform a responsive action, wherein the responsive action comprises blocking a functionality that is associated with the content card or releasing a previously set blockage of the functionality.

16. The apparatus of claim 15, wherein the functionality that is associated with the content card comprises at least one of the group consisting of:

navigating to a target resource, activating a media file, and rendering a resource within a browsed page presenting the carousel widget.

17. The apparatus of claim 15, wherein the timeframe measures a time since the content switch of the carousel widget until a subsequent user interaction with the carousel widget after the content switch, whereby selectively preventing user interactions with the carousel widget posteriori.

18. The apparatus of claim 15, wherein the timeframe measures a time since the content switch of the carousel widget until a current time, whereby user interactions with the carousel widget are a-priori prevented.

19. A computer program product comprising a non-transitory computer readable medium retaining program instructions, which program instructions when read by a processor, cause the processor to:

obtain a timeframe measuring a time since a content switch of a carousel widget, wherein the carousel widget displays a content card to a user, wherein the carousel widget is configured to periodically perform content switches to change displayed content of the carousel, wherein the content switch comprises switching a first content card with the content card, wherein prior to the content switch, the carousel widget displayed the first content card;

compare the timeframe to a time threshold; and based on said comparing, determine whether or not to perform a responsive action, wherein the responsive action comprises blocking a functionality that is associated with the content card or releasing a previously set blockage of the functionality.

\* \* \* \* \*